(12) United States Patent
Kaliaguine et al.

(10) Patent No.: US 6,716,548 B1
(45) Date of Patent: Apr. 6, 2004

(54) COMPOSITE ELECTROLYTE MEMBRANES FOR FUEL CELLS AND METHODS OF MAKING SAME

(75) Inventors: Serge Kaliaguine, Lac St-Charles (CA); Sergei Mikhailenko, Ste-Foy (CA); S. M. Javak Zaidi, Quebec (CA)

(73) Assignee: Universite Laval, Cite Universitaire (CA)

( * ) Notice: Subject to any disclaimer, the term of this patent is extended or adjusted under 35 U.S.C. 154(b) by 0 days.

(21) Appl. No.: 09/466,897

(22) Filed: Dec. 20, 1999

(30) Foreign Application Priority Data

Dec. 18, 1998 (CA) .............................................. 2256829

(51) Int. Cl.[7] .............................................. H01M 8/10

(52) U.S. Cl. .......................................... 429/33; 429/317

(58) Field of Search ........................ 429/33, 306, 31, 429/317; 252/62.2

(56) References Cited

U.S. PATENT DOCUMENTS

| | | | |
|---|---|---|---|
| 3,751,304 A | * 8/1973 | Biddick et al. | |
| 4,594,297 A | * 6/1986 | Polak et al. | 429/33 X |
| 4,797,185 A | * 1/1989 | Polak et al. | 429/33 X |
| 5,795,496 A | * 8/1998 | Yen et al. | 252/62.2 |
| 6,087,031 A | * 7/2000 | Iwasaki et al. | 429/33 |

OTHER PUBLICATIONS

Internet page: ORMOCER Homepage http://www.isc.fh-g.de/gb/ormmocere/o0.html.*
Appleby A.J., 1996, Phil. Trans. R. Soc. London, A354:1681–1693 month unknown.
Bailly et al., 1987, Polymer 28:1009–1016, May.
Bishop et al., 1985, Macromolecules 18:86–93, month unknown.
Cui et al., 1998, Separation and Purification Technology 14:145–154, month unknown.
Day et al, 1990, Journal of Analytical and Applied Pyrolysis 18:163–173, month unknown.
Dhar H.P., 1993, J. Electroanal. Chem. 357:237–250, month unknown.
Drzewinski et al., 1985, Journal of Applied Polymer Science 30:4753–4770, month unknown.
Engelhardt et al, 1987, J. Wiley & Sons, pp. 332–367, month N/A.
Faure et al., 1997, Symp. on New Mat. for Fuel Cell & Mod Battery Sys., .p 819, month unknown.
Hudson et al., 1992, Macromolecules 25:1759–1765, month unknown.
Jin et al., 1984, British Plym. J., 17:4–10, month unknown.
Kerres et al., 1993, 3rd Symp. on New Materials for Elect. Sys., p. 231, month unknown.
Knudsen et al., 1993, Solid State Ionics 61:153–161, month unknown.
Kobayashi et al., 1998, Solid State Ionics 106:219–225, month unknown.
Kreuer et al., 1995, Electrochemical Society Proceedings 95:241–246, month unknown.
Kreuer K.D., 1996, Chemistry of Materials 8:610–641, month unknown.
Lassegues J.C., 1992, Cambridge University Press pp. 311–328, month unknown.
Mikhailenko et al., 1997, Solid State Ionics 99:, month unknown.

(List continued on next page.)

Primary Examiner—Stephen Kalafut
(74) Attorney, Agent, or Firm—Goudreau Gage Dubuc

(57) ABSTRACT

The present invention relates to composite electrolyte membranes for fuel cells and methods of making same. More specifically, the present invention is directed to proton-conducting membranes for fuel cell applications. The present invention further describes materials which reach high intrinsic proton conductivity and are suitable for use as electrolytic membranes in methanol fuel cells.

16 Claims, 25 Drawing Sheets

OTHER PUBLICATIONS

Mikhailenko et al., 1998, J. Chem. Soc. Faraday Trans 94:1613–1618, month unknown.

Nolte et al., 1993, Journal of Membrane Science 83:211–220, month unknown.

Noshay et al., Journal of Applied Polymer Science 20:1885–1903, month unknown.

O'Gara et al., Journal of Polymer Science B: Polymer Physics 25:1519–1536, month unknown.

Park et al., 1996, Denki Kagaku 64:743–748, month unknown.

Pourcelly et al., 1992, Cambridge University Press, pp. 294–310, month unknown.

Savadogo O., 1998, Journal of New Material for Electrochem. Sys. 1:47–66, month unknown.

Schulz et al., 1996, Reactive & Functional Polymers 30:353–360, month unknown.

Shoesmith et al., 1994, Journal of Power Sources, month unknown.

Sivashinsky et al., 1983, J. App. Poly. Sci 28:3236–3245, month unknown.

Sone et al., 1996, J. Electrochem. Soc., 143:1254–1259, month unknown.

Steck et al., 1997, $2^{nd}$ S. on New Mat. for Fuel Cell & Mod. Battery Sys. pp 792–807.

Tazi et al., 1999, 3rd S. on New Mat for Electrochem. Sys. p. 259, month unknown.

Wainwright et al., 1995, J. Electrochem Soc. 142:121, Jul.

Zaidi et al., 1999, $3^{rd}$ S. on New Mat. For Electrochm. Sys. pp. 225–227, month unknown.

* cited by examiner

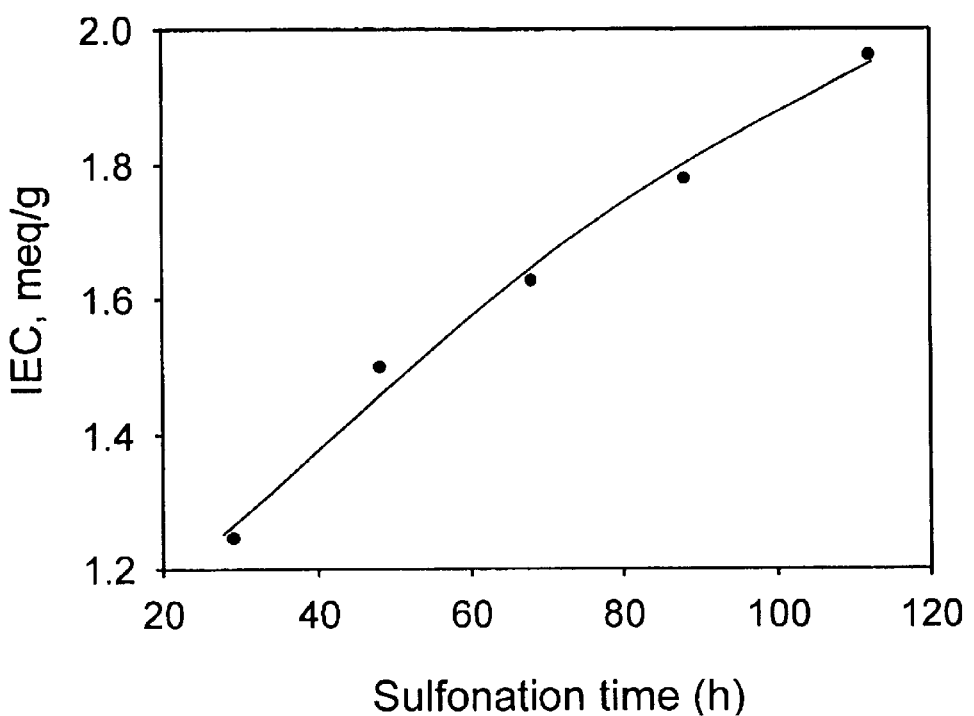
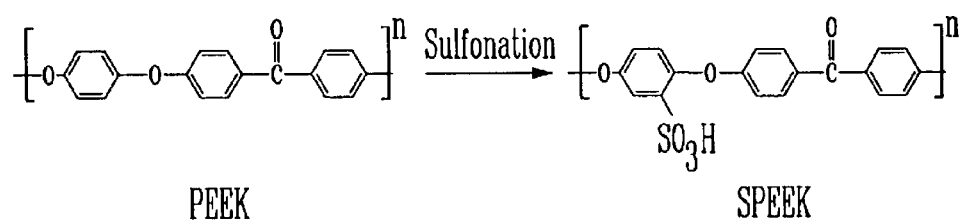
PEEK          SPEEK
FIG. 1

FIG_10

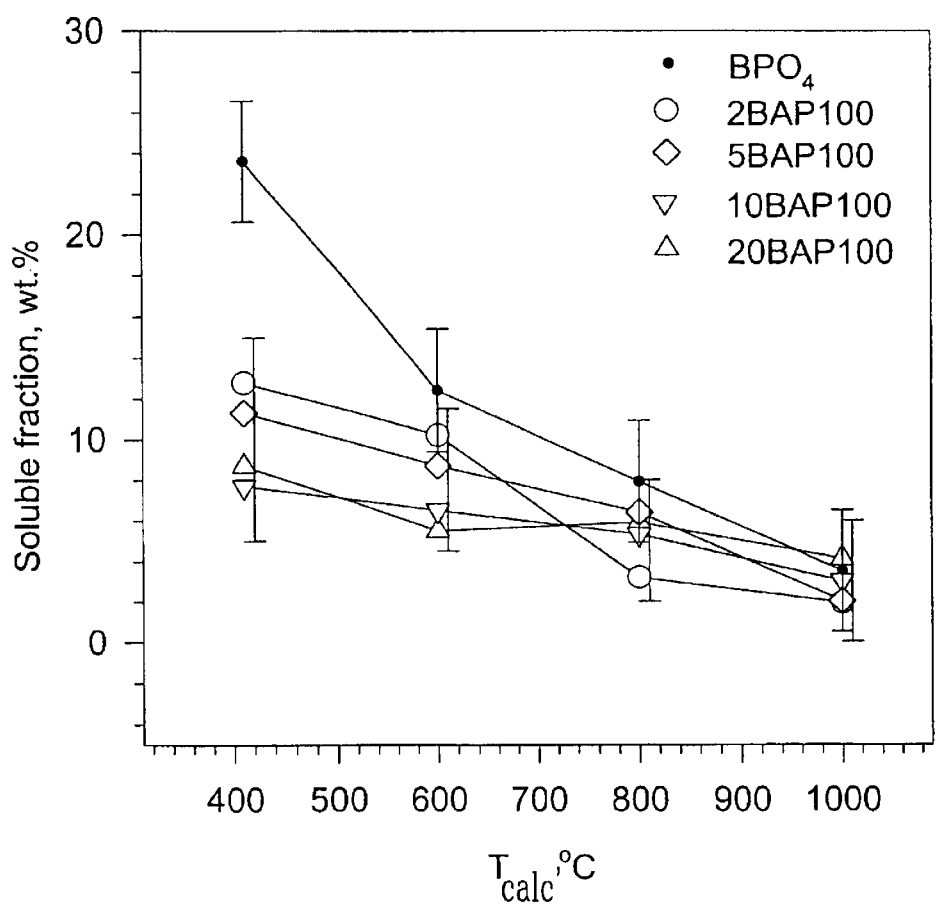
FIG_17A

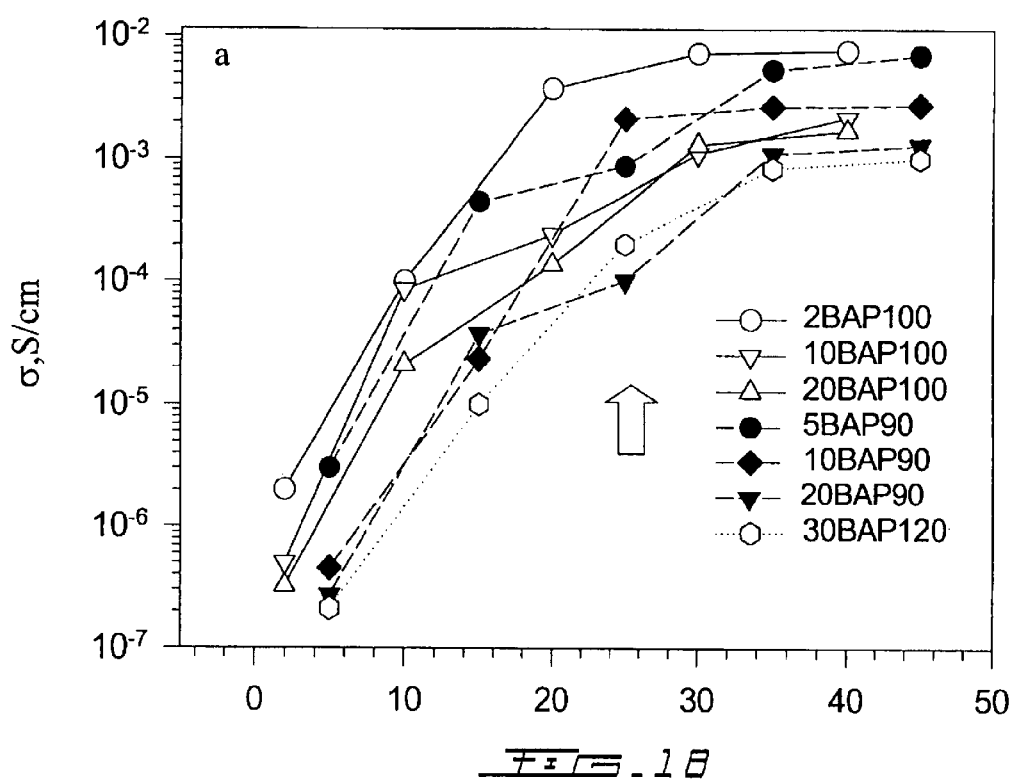

COMPOSITE ELECTROLYTE MEMBRANES FOR FUEL CELLS AND METHODS OF MAKING SAME

FIELD OF THE INVENTION

The present invention relates to composite electrolyte membranes for fuel cells and methods of making same. More specifically, the present invention is directed to proton-conducting membranes lot fuel cell applications. The present invention further describes materials which reach high intrinsic proton conductivity, and are suitable for use as electroiytic membranes in methanol fuel cells.

BACKGROUND OF THE INVENTION

The need for pollution control stimulated the development of polymer electrolyte membrane fuel calls (PEMFC) and attracted an increasing interest particularly for the automotive and stationary power applications [1–3]. For example, Daimler Benz presented in 1998 a fuel cell powered car, NECAR II with a total electric power close to 50 kW. A fuel cell is an almost ideal energy source yielding a very high thermal efficiency and an essentially zero release of atmospheric pollutants. In transport applications, the direct methanol fuel cell (DMFC) is presently considered as the most appropriate and promising. Up to now, only perfluorinated ionomers (PFI) membranes were considered to meet the requirements of polymer electrolyte membrane (PEM) fuel cells, namely, a high proton conductivity, a high stability in the cell operating conditions and a high durability. Presently the commercial solid polymer electrolyte material used in PEMFC is either perfluorinated NAFION (Du Pont) or NAFION-like polymers [4] supplied by Dow, Asahi Glass (FLEMION) and Asahi Chemicals (ACIPEX). Unfortunately, these PEMFC limit large scale application due to a number of drawbacks. First of all, these ionomers are very expensive. For example, the manufacturer's price for the NAFION membranes (Dupont de Nemours) scale exceeds 600 US$/m$^2$. Other membranes of this kind (DOW membranes, RAI membranes, . . . ) are still more expensive (up to 2000 US$/m$^2$). In fact, such membranes have been used for a long time in $H_2$ fuel cells for application where cost was not a main criterion (e.g. spacecraft, submarines etc). In addition, a significant drawback of these materials is their high permeability to methanol which allows an easy transport of this fuel from the anode to the cathode. This phenomenon, also called methanol crossover, reduce significantly the cell performance and must be diminished if not eliminated before DMFC can be commercialized.

Currently the necessity to reduce the cost of PEM stimulates the development of new proton conducting polymers. New studies are also undertaken in order to rationalize the most efficient combination of properties of the perfluorinated ionomer (PFI) polymer, which make them efficient proton conductors, and develop new polymers with similar properties by a less expensive chemistry. As a result PFI NAFION membrane has been extensively studied and tested in low temperature fuel cell systems [5]. In this context, Ballard Advanced Materials' group for the development of PEM membranes [6] recently developed a membrane based on a trifluorostyrene monomer called BAM3G (Ballard Advanced Material 3rd generation), which has demonstrated excellent performance and longevity of several thousand hours of operation.

The remarkable properties of PFI polymers lie in the combination of the high hydrophobicity of the fluorinated polymer backbone and high hydrophilicity of the sulfonic acid branches. The hydration of the PFI membrane is crucial for the performance of PEMFC since proton conductivity decreases drastically with dehydration. For instance, with NAFION membrane, which loses water above 80° C., the conductivity drops to very low values above this temperature.

One more limitation associated with NAFION type PFI membranes [2,4] is the methanol crossover when used in the direct methanol fuel cell (DMFC). This results in a decreased fuel cell performance due to depolarization of the oxygen reducing cathode. A further drawback of the perfluorinated polymers is that they are not environmentally friendly, a criteria that will be important when fuel cells become mass-produced.

The above mentioned disadvantages of PFI membranes induced many efforts to synthesize PEM based on hydrocarbon-type polymers and brought about the emergence of partially fluorinated and fluorine free ionomer membranes as alternatives to NAFION membranes. Among them the membranes based on aromatic polyether ether ketone (PEEK) were shown to be of promise for fuel cell application [7–9], as they possess good mechanical properties, thermal stability, toughness and some conductivity, depending on sulphonation degree. Nevertheless, the proton conductivity of PEEK or SPEEK has yet to reach a level sufficient to enable an adequate performance in a fuel cell.

Efforts have thus been made to improve the proton conductivity to composite membranes. For example, the addition of solids such as zeolites or tin-mordenite was aimed at improving the performance of the composite membranes. Unfortunately, their presence in the membranes does not impart thereto a high enough proton conductivity to make them useful as a solid electrolyte in polymer electrolyte membrane fuel cells (Mikhailenko et al. 1997, Microporous Mat. 11:37–44).

"Polymer Material for Electrolytic Membranes in Fuel Cells" by Yen et al., U.S. Pat. No. 5,795,496 is one such example of SPEEK with the aim of using it in fuel cells. The materials described in Yen et al. have low methanol permeability but high proton conductivity, and made from inexpensive, readily available materials. According to that invention, proton conducting membranes are formed based on a sulfonic acid-containing polymer. One preferred material is PEEK or PES. This invention is said to overcome disadvantages associated with the high cost of NAFION membranes and with its methanol permeability problems which allows for a substantial amount of fuel crossover across the membrane by using materials which were inexpensive starting materials and which enhanced protection against fuel crossover. In a particular embodiment, PEEK was sulfonated with $H_2SO_4$ to give H-SPEEK, a polymer which is soluble in an organic solvent and water mixture. While the inventors found that sulfonic acid increases the proton conducting performance of PEEK (the sulfonate groups are responsible for proton conductivity), it degrades the physical structure of the resulting membrane. Hence, the inventors developed a trade-off between the amount of sulfonation and appropriate physical structure by sulfonating less than one out of every three benzene rings. PBS was treated in an analogous manner. Yen et al. also teach methods of modifying the morphology of the processed polymers to limit the transport of methanol across the membrane (to reduce the free volume) by using zeolites tin motdeioite or the like. Unfortunately, such solids do not impart high enough proton conductivity to the composite membrane. However, Yen et al. do not teach a composite electrolyte membrane which reaches a high enough proton conductivity to be useful in PEM fuel cells.

During the last two decades solid electrolytes have attracted substantial attention owing to both their great potential in several electrochemical technologies, such as fuel cells, batteries and sensors, and the academic, interest in the phenomenon of fast ionic mobility in solids In spite of the fact, that a vast number of various proton conductors have already been identified, the development of chemically stable superionic conductors still remains one of the prime objectives among the current directions of research in solid state electrochemistry and materials science. Currently considerable efforts are being devoted to proton conducting salts of oxo acids including various hydrated and anhydrous phosphates Heteropolyacids (HPAs) are known as the most conductive solids among the inorganic solid electrolytes. Nevertheless, the use of HPAs or other solid inorganic acids in polymers and their effect on membranes for fuel cells, for example, has not been significantly addressed to show that they could enable the production of an effective, high proton-conductive membrane for fuel cells. For example. heteropolyacid/polyethersulfone membranes are described in Park et al., 1996, Denki Kagaku 64:743–747. However, these membranes are more than likely impossible to use commercially due to their lack of stability under conditions of fuel cell use.

Boron phosphate ($BPO_4$), a compound commonly synthesized from boric and phosphoric acids, has been widely used over the last three decades as an acidic catalyst in a number of reactions, including particularly dehydration reactions.

$BPO_4$ belongs to the class of orthophosphates in which both $P^{5-}$ and $B^{3-}$ are tetrahedrally coordinated by oxygen.

Although the foregoing suggests that $BPO_4$ in the presence of adsorbed water can possess interesting electrical properties, there were no attempts to look upon boron phosphate as being a solid proton conductor until the paper of Mikhailenko et al., 1998 (J. Chem. Soc., Faraday Trans. 94:1613–1618) which investigated the electrical properties of $BPO_4$. It is taught therein that the conductivity of thermally treated boron phosphate is of only one order of magnitude inferior to that of such prominent solid electrolytes as hydrated heteropolyacids. At the same time, the chemically durability of $BPO_4$ is far higher than that of HPAs, which are 100% soluble in water. Therefore, boron phosphate can be regarded as having some potential in electrochemical applications, such as fuel cells, hydrogen gas sensors and humidity sensors.

There thus remains a need to provide composite electrolyte membranes, which retain a proton conductivity which is high enough to make it useful in polymer material for electrolytic membrane in fuel cell PEMFC. There also remains a need to provide such composite membranes which provide a proton conductivity which is comparable to that of NAFION™ membranes and in addition overcome disadvantages in the membranes of the prior art such as pollution, low thermal efficiency and substantial costs.

The present invention seeks to meet these and other needs.

The present description refers to a number of documents, the content of which is herein incorporated by reference in their entirety

SUMMARY OF THE INVENTION

The invention concerns a composite electrolyte membrane comprising a filler material which contributes to the enhancement of the protonic conductivity of the membrane. In a particular embodiment of the present invention the composite electrolyte membrane possesses a high enough proton conductivity to be an alternative energy source for stationary and mobile applications in a particularly preferred embodiment of the present invention the composite electrolyte membrane possesses a high enough proton conductivity to be used in methanol fuel cells.

The present invention further relates to composite electrolyte membranes comprising a polymer matrix and a filler material which contributes to the enhancement of the protonic conductivity of the membrane. In a particular embodiment the filler material contributes significantly more than the polymer matrix to the protonic conductivity of the membrane. In another embodiment, both the polymer matrix and filler material contribute significantly to protonic conductivity of the membrane. In a preferred embodiment of the present invention, the filler material is an inorganic solid acid. In a particularly preferred embodiment of the present invention, the polymer matrix of the composite electrolyte membrane is modified PEEK and the filler material is $BPO_4$. In a more particularly preferred embodiment, the modified PEEK is sulfonated PEEK (SPECK).

The invention in addition relates to an environment-friendly composite electrolyte membrane comprising an environment-friendly polymer matrix and an environment-friendly filler material which contributes to the enhancement of the protonic conductivity of the membrane. In a preferred embodiment, the environment-friendly polymer matrix is a modified PEEK and the environment-friendly filler is an inorganic solid acid. In a particularly preferred embodiment of the present invention, the environment-friendly polymer matrix of the composite electrolyte membrane is SPEEK and the environment-friendly filler material is $BPO_4$.

The invention further relates to composite electrolyte membranes for fuel cells, which remains efficient at a temperature above about 80° C., preferably above about 90° C., most preferably about 100° C., and even more preferably between about 100° C. and 120° C.

In addition, the invention relates to fuel cell membranes comprising a solid electrolyte embedded in a polymer matrix, wherein the solid electrolyte contributes to the protonic conductivity of the membrane The invention also relates to methods for preparing and pretreating an inorganic solid acid, so as to embed it in a polymer matrix for fuel cells.

In addition, the invention relates to methods for embedding a solid inorganic acid in a polymer matrix.

Before the present invention, solid fillers in composite membranes were not contributing sufficiently to the protonic conductivity of the membrane.

In accordance with the present invention, there is therefore provided a method of increasing the proton conductivity of a composite electrolyte membrane comprising an acidic polymer matrix, the method comprising an embedding of a proton conductivity effective amount of an organic solid acid in the matrix.

In accordance with another aspect of the present invention, there is provided a method of increasing a proton conductivity and/or a stability of a proton conductivity at a temperature above about 80° C., in a polymer electrolyte membrane for fuel cell, comprising an embedding into the polymer of a proton conductivity effective amount of an inorganic solid acid.

While the composite electrolyte membranes of the instant invention have been demonstrated in particular with SPEEK in which $BPO_4$ or heteropolyacids (HPAs) have been imbedded, the invention should not be so limited. Indeed, the present invention relates to composite electrolyte membranes in which a polymer matrix is embedded with a solid inorganic acid. Non-limiting examples of inorganic acids which could be used in accordance with the present invention include HPAs (also exemplified hereinbelow). Including tungtsophoric acid (Mikhailenko et al., 1997, Solid State Ionics 99 281–286), molybdophosphoric acid, and molybdosilicic acid; zirconium or titanium oxophosphates and sulphates; grafted silica materials such as for example ORMOSIL and ORMOCER ceramics, and mixtures of these inorganic acids. Broadly, the skilled artisan, to which the present invention pertains, will understand that any polymer matrix, and especially any sulfonated and/or phosphorylated polymer matrix having the requisite structural characteristic enabling the formation of a membrane having the requisite protonic conductivity, following the teachings of the present invention, can be used.

The skilled artisan to which the present invention pertains will understand however, that the inorganic solid acid should be chosen amongst the acids having a sufficient acidic strength to provide the necessary protonic conductivity to the polymer and membrane. The contribution of the inorganic solid acid to The total weight of the membrane should be below about 80% and preferably below 70%.

The skilled artisan should also comprehend that the present invention should not be limited to SPEEK. Indeed, other polymer matrices can be used in accordance with the present invention. Non-limiting examples thereof include polysulfones, polystyrenes, polyether imides, polyphenylenes, poly alpha olefins, polycarbonates and mixtures thereof. Similarly, the modification of these polymer matrices is not limited to sulfonation since, for example, phosphorylation could also be used.

In addition, it is herein demonstrated that an inorganic solid acid, such as $BPO_4$ can be modified to enhance is protonic conductivity capacity and/or the stability thereof. The possibility to enhance the $BPO_4$ inertness towards water was assessed by the introduction of aluminum as a stabilizing component. The resulting $Al-BPO_4$ compound was used to monitor its conductivity by impedance spectroscopy as a function of Al loading, calcination temperature and water content. It was discovered that the partial replacement of boron with aluminum in boron phosphate brings about an increase in inertness of the solid towards water. In some cases it is achieved at the expense of a decrease in its conductivity. However, samples with Al/B (5/95 calcined at T<600° C. where found to possess the same conductivity as pure $BPO_4$, in spite of their lesser solubility compared to boron phosphate. This observation reinforces the view that a compromise between high proton conductivity and high stability of boron phosphate is feasible, and can be achieved, among other approaches, through chemical modification of the embedded solid.

In accordance with the present invention, it will be understood that further modifications can be made to the composite membrane. As will be seen below with PET, the incorporation of a basic compound into the acidic polymer matrix can improve its conductivity and/or stability. Non-limiting examples of such basic compounds which can be incorporated into the composite electrolyte membranes, in accordance with the present invention include polyethermide (PEI) and polyoxadiazole. PEI is a porous solid which can retain water and release it upon drying of the membrane, thereby maintaining a more efficient conductivity of the membrane with time (especially at higher temperatures, which tend to accelerate the drying and hence the diminishing of the conductivity of the membrane).

In addition, while solid fillers such as a zeolite material, (e.g. mordenite; see for example U.S. Pat. No. 5,795,496), or silicium material do not contribute to the protonic conductivity of the membrane, it should be clear to the skilled artisan, that the composite electrolyte membranes of the present invention could benefit from an addition of such fillers which can reduce methanol crossover (the filler serving as a sieve through which the methanol molecule cannot pass) and/or stabilize the membrane (e.g. by retaining water), thereby enhancing the preservation of the proton conductivity of the membranes. Numerous methods to incorporate fillers into the polymer matrix are known in the art (e.g. WO 90/29752, of Grot et al., published Sep. 26, 1996).

Always keeping in mind the need to maintain a structural and chemical stability for the resulting composite membrane, such fillers (basic fillers such as PEI or non-basic fillers) can be added to an amount of about 10% or less, and preferably to about 5% or less, based on the total weight of the membrane.

Properties which are preferred or required for direct methanol fuel cells (PMFC) arc as follows: a high proton conductivity of at least about $5 \times 10^{-2}$ S/cm in order to reduce Ohmic losses; a good mechanical resistance of films of 100 $\mu$m thickness; a low permeation of reactants and products of the electrochemical combustion; a high chemical and electrochemical stability in the cell operating conditions; and a cost compatible with commercial requirements.

The terminology "possessing high enough proton conductivity", "maintaining a high enough proton conductivity" and the like, should be understood by the person skilled in the art, to be dependent on the context of use of the composite electrolyte membranes in accordance with the present invention. For example, when using such membranes in a fuel cell, the conductivity of the composite membrane is preferably above about $2 \times 10^{-2}$ S/cm. More preferably, above about $5 \times 10^{-2}$ S/cm and even more preferably equal to or above $10^{-1}$ S/cm. Since the conductivity of NAFION membranes often ranges between $2 \times 10^{-2}$ and $2 \times 10^{-2}$ S/cm, when referring to a conductivity which is comparable to that of NAFION membranes, the conductivity for the fuel cell composite membrane refers to a conductivity which is in that range or better.

It should be understood by the skilled artisan that since the structural and chemical stability of the membrane is critical to ensure an efficient and stable conductivity of the membrane, that the actual contribution of different materials in the composite membranes based on the total weight thereof needs to be taken into account.

BRIEF DESCRIPTION OF THE DRAWINGS

Having thus generally described the invention, reference will now be made to the accompanying drawings, showing by way of illustration a preferred embodiment thereof, and in which:

FIG. 1a shows the ion exchange capacity of SPEEK polymers as a function of time of sulfonation. FIG. 1b shows the reaction of sulfonation of PEEK;

FIGS. 17a and 17b show the apparent solubility of aluminum boron phosphate in water (1 wt % slurry stirred for 15 h at ambient temperature) as a function of the calcination temperature FIG. 18 shows the conductivity of different samples of aluminum boron phosphate at ambient temperature as a function of water content The solids were calcined at (a) 400° C. and (b) 1000° C.;

Figure 2A:
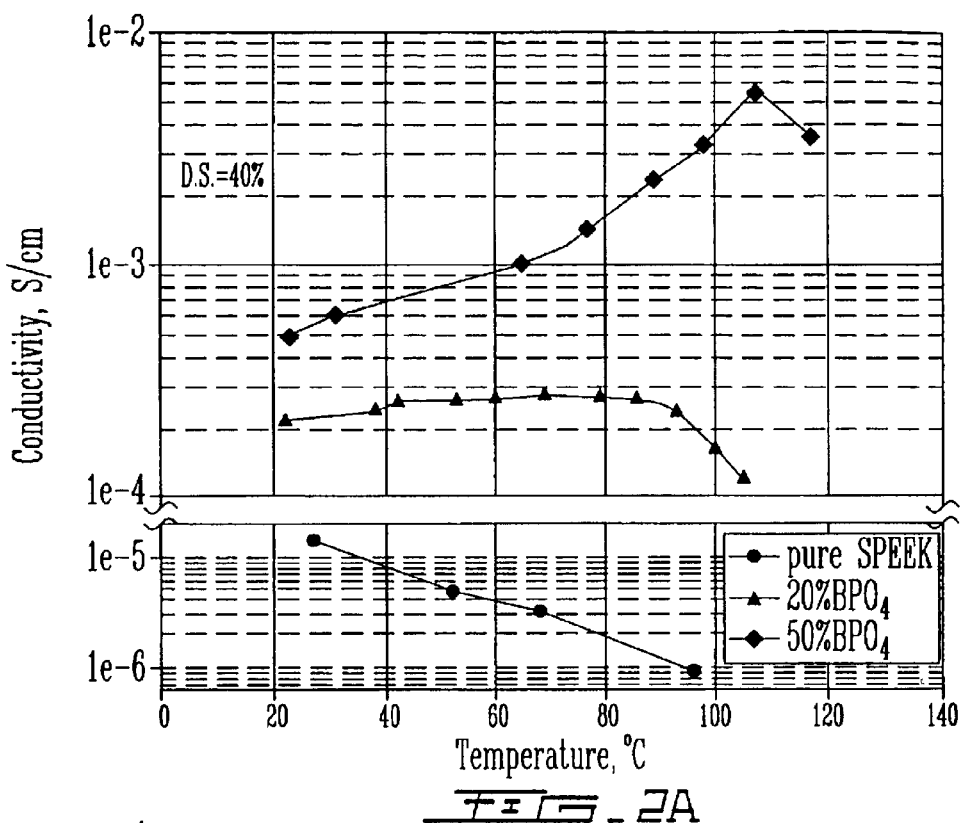
FIGS. 2a, 2b, 2c and 2d show the conductivity of PEEK as a function of their degree of sulfation (D.S.) and as a function of the loading of $BPO_4$ thereinto.

Other objects, advantages and features of the present invention will become more apparent upon reading of the following non-restrictive description of preferred embodiments with reference to the accompanying drawing which is exemplary and should not be interpreted as limiting the scope of the present invention.

DESCRIPTION OF THE PREFERRED EMBODIMENT

The approach that was used to develop the membranes of the present invention is based on the general principle of composite materials, which is to combine the properties of each of at least two components to reach a desired set of properties for the composite materials. Most of the known proton conductors are not appropriate for the fabrication of membranes, being too fragile and of little mechanical resistance as a film. Electrolyte membranes can however be prepared with a polymer matrix. Professor E. Skou of the University of Odense (Denmark) first proposed the use of a composite membrane in fuel cells. The studies of his group were however essentially oriented toward the use of zeolites as proton conductors/filler material. The best ones they identified were tin modified mordenites. These studies were stopped in the mid nineties without reaching their objectives, mainly because the membranes never reached a high enough proton conductive to be effective for fuel cell use.

A systematic study of the electrical properties of different filler materials led to the present invention: an electrolyte composite membrane comprising an inorganic solid acid which significantly contributes to the proton conductivity of the membrane. In accordance with one embodiment of the present invention, the composite membrane comprises $BPO_4$ as the solid inorganic acid. In the presence of $BPO_4$, the composite membranes have a conductivity higher than $10^{-2}$ S/cm and depending on the conditions of its preparation it can reach a high stability in aqueous media. The electrical properties of $BPO_4$ are influenced by the preparation and pretreatment condition. In accordance with a preferred embodiment of the proton conducting membranes of the present invention, powdered $BPO_4$ is used and synthesized at 120° C., with a particle size of 60 mesh and calcined at 400–500° C.

As an example of a polymer matrix which can be used in the composite membrane in accordance with the present invention, poly-aryl ether ether Ketone (PEEK), a rigid and thermally stable thermoplastic, was used. Its formula is as follows:

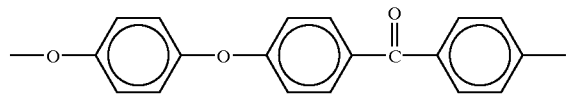

PEEK has a hydrophobic character and does not allow its use as solid electrolyte in the presence of water. In order to make PEEK more water compatible and to give it proton conduction properties, PEEK was sulfonated in concentrated sulfuric acid (FIG. 1b). As for essentially every polymer, when the level of sulfonation is raised, highly sulfonated SPEEK become for example partly soluble in methanol. The level of sulfonation of SPEEK should thus preferably not exceed 70% so that it retains its chemical stability. Even partially sulfonated SPEEK reaches a rather high proton conductivity. FIG. 1a shows the variation in SPEEK conductivity with sulfonation. It can be seen that the conductivity is continuously increasing with reaction time. Of note, PEEK dissolved in $H_2SO_4$ does not undergo molecular weight degradation even for long periods of time. Also, in the absence of solid inorganic acid, SPEEK samples have a rather high conductivity which depends strongly on the duration of the sulfonation process. In particular, the sample treated or 112 h showed a conductivity of the order to $3 \times 10^{-2}$ S/cm which remains reversible even once the sample has been heated to 120° C. For the other samples (sulfonated for a shorter time) this conductivity is not as stable and it drops irreversibly after heating to 100–120° C.

The composite PEM of the present invention, comprising an inorganic solid acid and particularly $BPO_4$/SPEEK membranes are very promising for the fabrication of fuel cells. These membranes may indeed be utilized as an electrolyte separating the anode from the cathode and they may be used over a temperature range of 100–120° C. Usually PEM fuel cells work at temperatures below 80° C. (i.e. those based on NAFION membranes). The membranes of the present invention being stable at higher temperature should thus be very stable in the working conditions of the cell.

Figure 2B:
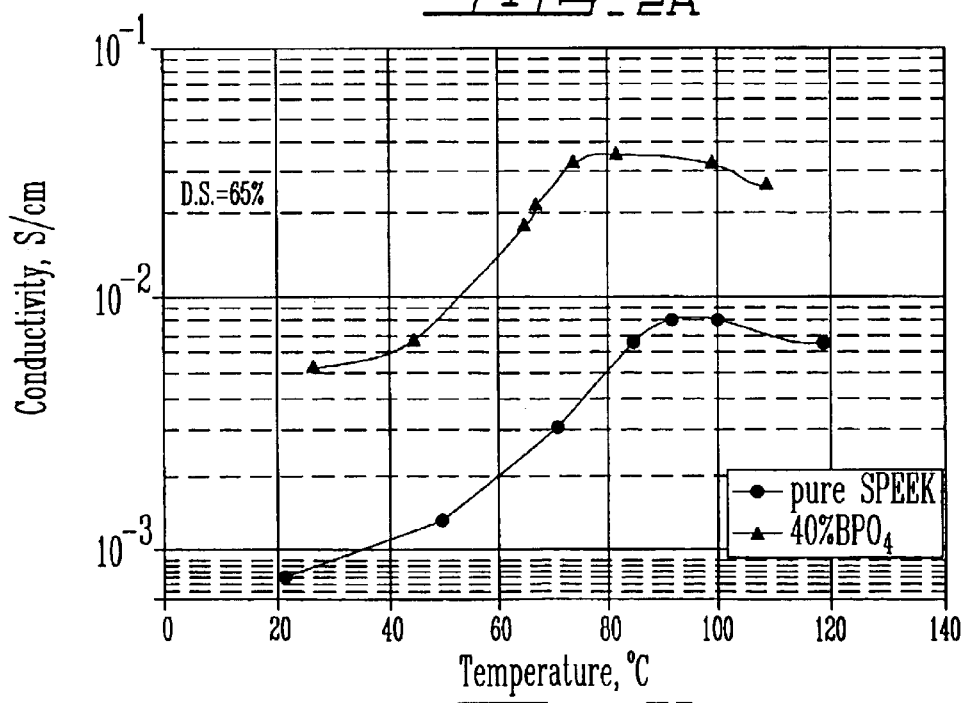
Figure 2C:
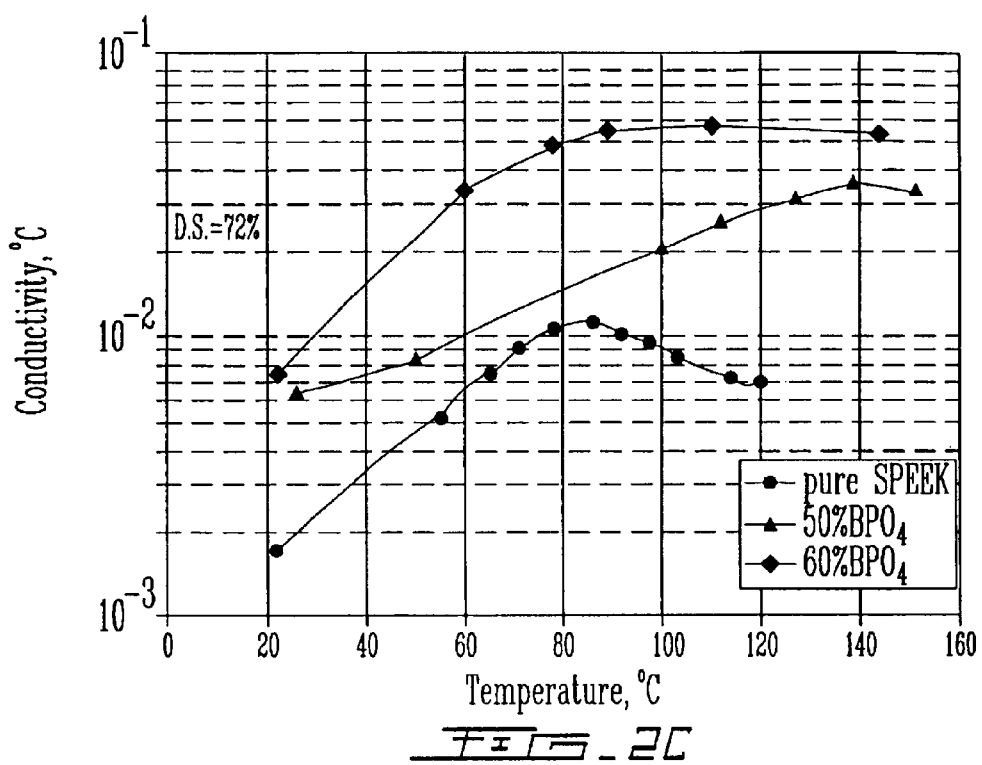
Figure 2D:
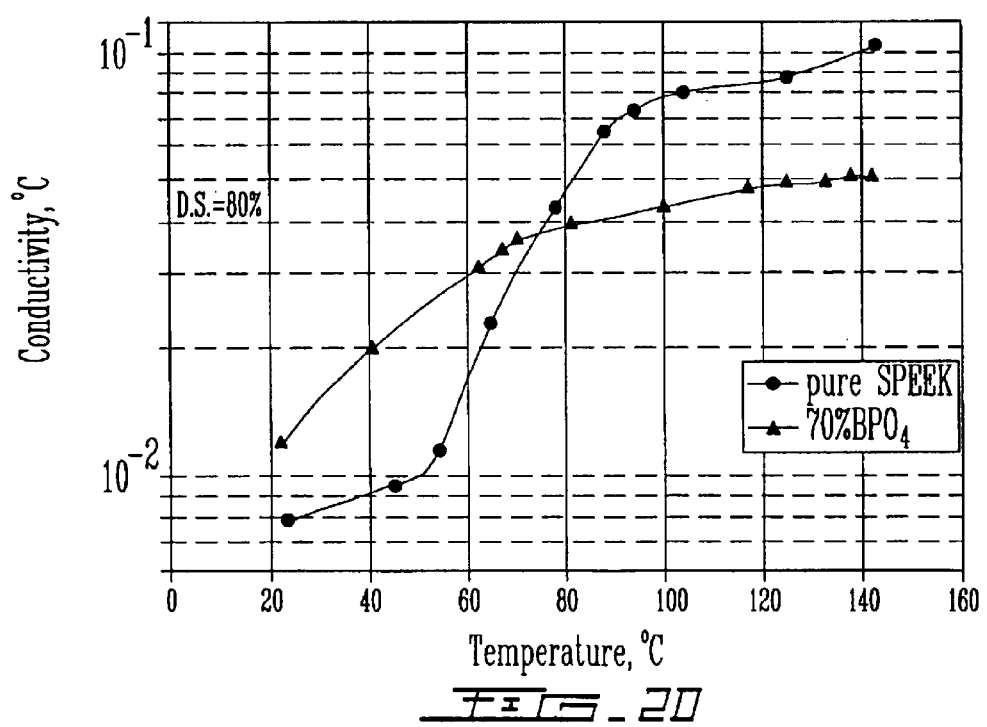

FIGS. 2a and 2b show the conductivity of PEEK, sulfonated up to different degrees of sulfonation (D.S.) as a function of temperature. From these figures, it is clear that for D.S. of 40%, the introduction of a solid inorganic acid such as $BPO_4$ significantly increases the conductivity of the resulting composite electrolyte membrane by ten to two thousand fold, depending on the temperature, as compared to pure SPEEK which only exhibits, a poor conductivity below $10^{-5}$ S/cm. Similarly, embedding of $BPO_4$ into SPEEK of 65 and 72% also proves the proton conductivity of the resulting composite membrane as compared to pure polymer. SPEEK sulfonated at 80% possesses a very high conductivity. In such a case ,conductivity of the composite membrane only moderately increases by embedding an inorganic solid acid such as $BPO_4$ and with a very high concentration thereof (70%). Furthermore, as can be seen from FIG. 2d the embedding of $BPO_4$ only increases the conductivity of the composite membrane, as compared to pure SPEEK, only up to about 80° C. At higher temperatures, conductivity of the composite electrolyte membrane was lower than that of pure SPEEK, it is possible that a dehydration of $BPO_4$ hampers proton transfer and is responsible for the lower conductivity of the SPEEK/$BPO_4$ composite membrane. Furthermore, it should be mentioned that the mechanical properties of SPEEK sulfonated to D.S. of 80% is too poor to be used efficiently in a polymer electrolyte membrane (PEM) in fuel cells.

The present invention is illustrated in further detail by the following non-limiting examples.

EXAMPLE 1

The Composite Electrolyte Membranes Comprising SPEEK and $BPO_4$

Powdered $BPO_4$ was dispersed in a dimethyl acetamide (DMA) solution of sulfonated PEEK and stirred for 24–48 hours. Methods for sulfonating a polymer such as PEEK are known in the art. One example thereof is described in Examples 2 and 11. After evaporation of the solvent, the polymer/$BPO_4$ blend was spread over a glass plate and dried for 12 hours at room temperature; for 8 hours at 40° C. and for another 12 hours at 120° C. under vacuum, thereby eliminating any trace of DMA. Before their conductivity was measured, the membranes were stabilized by immersion for several hours in water, which increases their proton conductivity. Of note, the conductivity of the composite membranes is more stable thermally than the one of SPEEK membranes (FIG. 2).

EXAMPLE 2

Preparation of Polymers

Poly-aryl ether ether ketone (PEEK), the chemical structure of which was shown in FIG. 1b, is a thermostable polymer with an aromatic, non-fluorinated backbone, in which 1,4-disubstituted phenyl groups are separated by ether (—O—) and carbonyl (—CO—) linkages. PEEK can be functionalized by the sulfonation technique and the sulfonation degree can be controlled by reaction time and temperature. The second component of these composite membranes, heteropolyacids (HPAs), are known as the most conductive solids among the inorganic solid electrolytes at near-ambient temperature [4,10–12]. For instance, the hydrate form of tungstopbosphoric acid exhibits a room temperature conductivity of $1.9 \times 10^{-1}$ S/cm [11], and its sodium form has a conductivity of about $10^{-2}$ S/cm [12]. The HPAs are soluble in polar solvents, where they produce stable Keggin type anions such as $PW_{12}O_{40}$. The strong acidity of HPAs is attributed to the large size of the polyanion yielding low delocalized charge density.

One aim of the present invention was to assess the contribution of hydrated HPAs to the proton conductivity of a hydrophilic polymer matrix when appropriately embedded thereinto and to assess the mechanical properties of the polymer film. The fillers exemplified herein include tungstophosphoric acid (TPA), its sodium salt (Na-TPA) and molybdophosphoric acid (MPA). The binder matrix was partially sulfonated PEEK (SPEEK). The sulfonated form of PEEK was used in order to provide the polymer matrix with some hydrophilicity. The electrical and thermal properties of these new composite heteropolyacid-SPEEK membranes show their potential as alternatives to NAFION membrane in PEMFC.

In order to improve proton conductivity, composite membranes were synthesized in order to incorporate solid heteropolyacids (HPA) into partially sulfonated PEEK polymer matrices (SPEEK).

PEEK used in this study was bought from Polysciences, Inc, USA in the form of extrudates. For the modification of this polymer concentrated H2SO4(95–98%) was used as the sulfonating agent. PEEK was dried in a vacuum oven at 100° C. overnight. Thereafter, 20 g of polymer was dissolved in one liter of concentrated sulfuric acid and vigorously stirred for the desired time ranging from 24 h to 112 h at room temperature. Then the polymer solution was gradually precipitated into a large excess of ice-cold water under continuous mechanical agitation. The agitation was continued one hour further and then the polymer suspension was left overnight for phase separation. The precipitate was collected by filtration and, in order to remove any trapped acid, it was washed several times with an excess of distilled water until the washing water became neutral. The solid was then dried under vacuum for 8–10 h at 100° C. The final product is the sulfonic acid form of PEEK, i.e. SPEEK. It has a yellow or yellowish red color due to self protonation of carbonyl groups. The SPEEK samples were not neutralized and were stored in the free acid form (H-SPEEK).

The ion-exchange capacity (IEC) of sulfonated PEEK polymers was determined by titration: 2–5 g of the SPEEK were placed in 1M aqueous NaOH and kept for one day. The solution was then back titrated with 1M HCl using phenolphthalein as an indicator.

EXAMPLE 3

Heteropolycompounds

The solid HPAs used in the work were purchased from Fluka Chemicals, and were used as received. The HPAs used were tungstophosphoric acid, $H_3PW_{12}O_{40} \cdot 29H_2O$ (TPA), molybdo-phosphoric acid, $PMo_{12}O_{40} \cdot 29H_2O$ (MPA) and the disodium salt of tungstophosphoric acid, $Na_2HPW_{12}O_{40}$-(TPA).

EXAMPLE 4

Differential Scanning Calorimetry

DSC measurements were performed on SPEEK samples as well as on SPEEK membranes using a Du Pont 910 Differential Scanning Calorimeter at a heating rate of 10° C./min under nitrogen atmosphere. Indium (melting point 156.6° C.) was used as the calibration standard. The DSC experiments were carried out in two steps. Approximately 10–15 mg samples were dried by heating at 20° C./min to 200° C., then quenched in liquid nitrogen and then heated again to 250° C. at 10° C./min. The glass transition temperature, Tg was calculated at the intersection of the tangents to the corresponding DSC curve.

EXAMPLE 5

Thermogravimetry

The TGA was carried out using a Du Pont 951 model thermobalance controlled by a 2100 thermal analysis station. The samples were first dried at 200° C. to remove any moisture/solvent for 30 min, and then programmed from 90 to 900° C. at 10° C./min under a nitrogen atmosphere. Approximately 15–20 mg sample was used for each run.

EXAMPLE 6

$^1$H NMR

The $^1$H-NMR spectra were recorded on a Varian Unity Inova spectrometer at a resonance frequency of 399.961 MHz. For each analysis, a 2–5 wt % polymer solution was prepared in DMSO-d6 and TMS was used as the internal standard. NMR data were acquired for 64 scans at a temperature of 30° C. The acquisition parameters were set to a spectral window of 6000 Hz (15 ppm), a pulse angle of 55 degrees, acquisition time of 2 s and relaxation delay of 1 s. Accurate integrations of distinct aromatic signals were used to determined the degree of sulfonation.

EXAMPLE 7

Membrane Preparation

The SPEEK polymer was first dissolved (5–10 wt. %) in dimethylacetamide (DMAc) and the appropriate mass of powdered HPA was then added to the solution. The resulting polymer mixture was stirred for 16–24 h, and, after evaporation of most of the solvent, cast onto a glass plate using a casting knife. The cast membranes were first dried at room temperature overnight and then at 60° C. for 4–6 h and at 80–120° C. overnight. The content of HPA in the dry product was 60 wt. %.

EXAMPLE 8

Electron Microscopy

The morphologies of the composite polymer membranes were investigated using a scanning electron microscope (JSM-849, JEOL). Specimens for the SEM were prepared by freezing the dry membrane samples in liquid nitrogen and breaking them to produce a cross-section. Fresh broken surfaces of the samples were vacuum spray-coated with a thin layer of Au/Pd prior to viewing in SEM.

EXAMPLE 9

Water Absorption of Membranes

The water absorption of SPEEK membranes was determined from the difference in weight (W) between the dry and the swollen membranes. The membrane, cast from DMAc solution after drying, was weighed and then soaked in water until the weight remained constant. It was then taken out, wiped with blotting paper and weighed again. The percentage of water absorbed was calculated with reference to the weight of the dry specimen: $(W_{wet}/W_{dry}-1)\times100\%$.

EXAMPLE 10

Conductivity Measurements

The proton conductivity of the polymer membrane samples was measured by the AC impedance spectroscopy technique over the frequency range of 1 $10^7$ Hz with oscillating voltage 50–500 mV, using a system based on a Solarton 1260 gain phase analyzer. A sample of the membrane with diameter 13 mm was placed in an open, temperature controlled, parallel-plate electrode test cell, where it was clamped between two blocking stainless steel electrodes with a permanent pressure of about 3 kg/cm$^2$. The main shortcoming of an open cell, the specimen dehydration during the measurement, is compensated by such advantages as the possibility to provide good electrode-specimen contact (by applying sufficient thrust using an external load) and access to a larger temperature range (typically up to 150° C.). Moreover, the thin specimen discs (100–500 μm) soaked in water prior to the test, being tightly compressed between blocking electrodes, can only lose water through their edges, which is negligible at low temperature over time scale of the experiment.

The conductivity σ of the samples in transverse direction was calculated from the impedance data, using the relation (σ=d/RS where d and S are the thickness and face area of the sample respectively, and R was derived from the low intersect of the high frequency semi-circle on a complex impedance plane with the Re(Z) axis. The impedance, data were corrected for the contribution from the empty and short-circuited cell.

EXAMPLE 11

Sulfonation of PEEK

There are different methods for sulfonation of PEEK. Herein, sulfonation by concentrated $H_2SO_4$ (95–98%) was selected because it is a simple and safe reaction procedure. It allows to avoid degradation and cross-linking reactions [13, 14] which always accompany sulfonation with 100% $H_2SO_4$ or with chlorosulfonic acid. Cross-linking is presumably the result of sulfone formation, which should be negligible in $H_2SO_4$ containing a few percent of water (95–98%), because H O decomposes the aryl pyrosulfate intermediate, required for sulfone formation [13].

The PEEK was sulfonated for different reaction times ranging from 24 h to 112 h to produce polymers of various decrees of sulfonation. It is known that the degree of sulfonation, can be controlled by changing reaction time, acid concentration and temperature, which can provide a sulfonation range of 30 to 100% per repeat unit [12, 13]. It has been observed in [13] that PEEK dissolved in $H_2SO_4$ does not undergo molecular weight degradation even for long periods of time.

It is worth noting that SPEEK is heterogeneous with respect to the degree of sulfonation of individual polymer molecule repeat units. The extent of this heterogeneity is important to consider, as it might influence SPEEK properties, such as crystallinity and solubility [13, 15]. Heterogeneity is a consequence of the random nature of the sulfonation. Moreover, this heterogeneity is aggravated by the slow kinetic of dissolution of PEEK in sulfuric acid, which depends on the molecular weight of the polymer chains and their accessibility (surface of granules dissolves before bulk). Presumably, the difficulty in dissolving PEEK is caused by the strong intercrystalline forces. The solubility of PEEK in strong acids can be attributed to protonation of the ketone groups and in some cases to chemical modification (e.g. sulfonation) of toe polymer [14, 15] Sulfonation is an electrophilic reaction, therefore, its effectiveness depends on the substituents present on the aromatic ring. With PEEK the hydroquinone unit (between the ether bridges) can be sulfonated under relatively mild conditions, being doubly activated towards electrophilic reactions.

The physical and chemical properties of SPEEK depend on the content of sulfonic groups and the nature of counter ions. Sulfonation modifies the chemical character of PEEK, reduces the crystallinity and consequently affects solubility. For example, at sulfonation degrees lower than 30% SPEEK is soluble only in strong $H_2SO_4$. Above 30% sulfonation the SPEEK polymers are soluble in hot dimethylformamide (DMF), dimethylacetamide (DMAc), and dimethylsulfoxide (DMSO); above 40% in the same solvents at room temperature; above 70% they are soluble in methanol and at 100% sulfonation in hot water [13, 14].

The ion-exchange capacity (IEC) of SPEEK polymers measured at room temperature is presented in FIG. 1 as a function of time of sulfonation. It can be seen that IEC is continuously increasing with reaction time. Upon sulfonation, PEEK reached an IEC close to 2.0 meq/g within 112 h.

EXAMPLE 12

Determination of the Degree of Sulfonation

The degree of sulfonation was determined quantitatively by $^1$H NMR using a modification of the method described in [16] for SPEEK polymer. In the $^1$H NMR spectra, the presence of a sulfonic acid group causes a significant 0.25 ppm down-field shift of the hydrogen $H_L$ compared with $H_C$, $H_D$ in the hydroquinone ring. The nomenclature of the aromatic protons for the sulfonated PEEK repeat unit is given below:

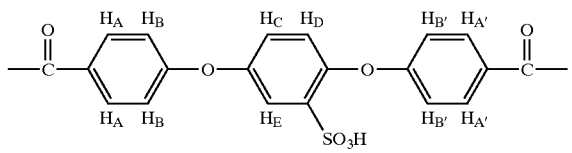

The presence of each sulfonic acid group SO$_3$H will result in a distinct signal for protons at the E position. Knowing the intensity of this $^1$H signal, one can estimate the $H_L$ content which is equivalent to the SO$_3$H group content. The $^1$H NMR signal for the SO$_3$H group is less easy to record directly as this proton is labile. The ratio between the peak area of the distinct $H_F$ signals, ($AH_E$), and the intergrated peak area of the signals, corresponding to the other aromatic hydrogens ($AH_{A,A',B,B'C,D}$), is expressed as:

$$n/(12-2n)=AH_E/\Sigma AH_{AA\ BB\ C\ D}, (0 \leq n \leq 1)$$

where n is the number of $H_E$ hydrogens per repeat unit. An estimate of the degree of sulfonation x is obtained as: x=n×100%

Figure 2E:
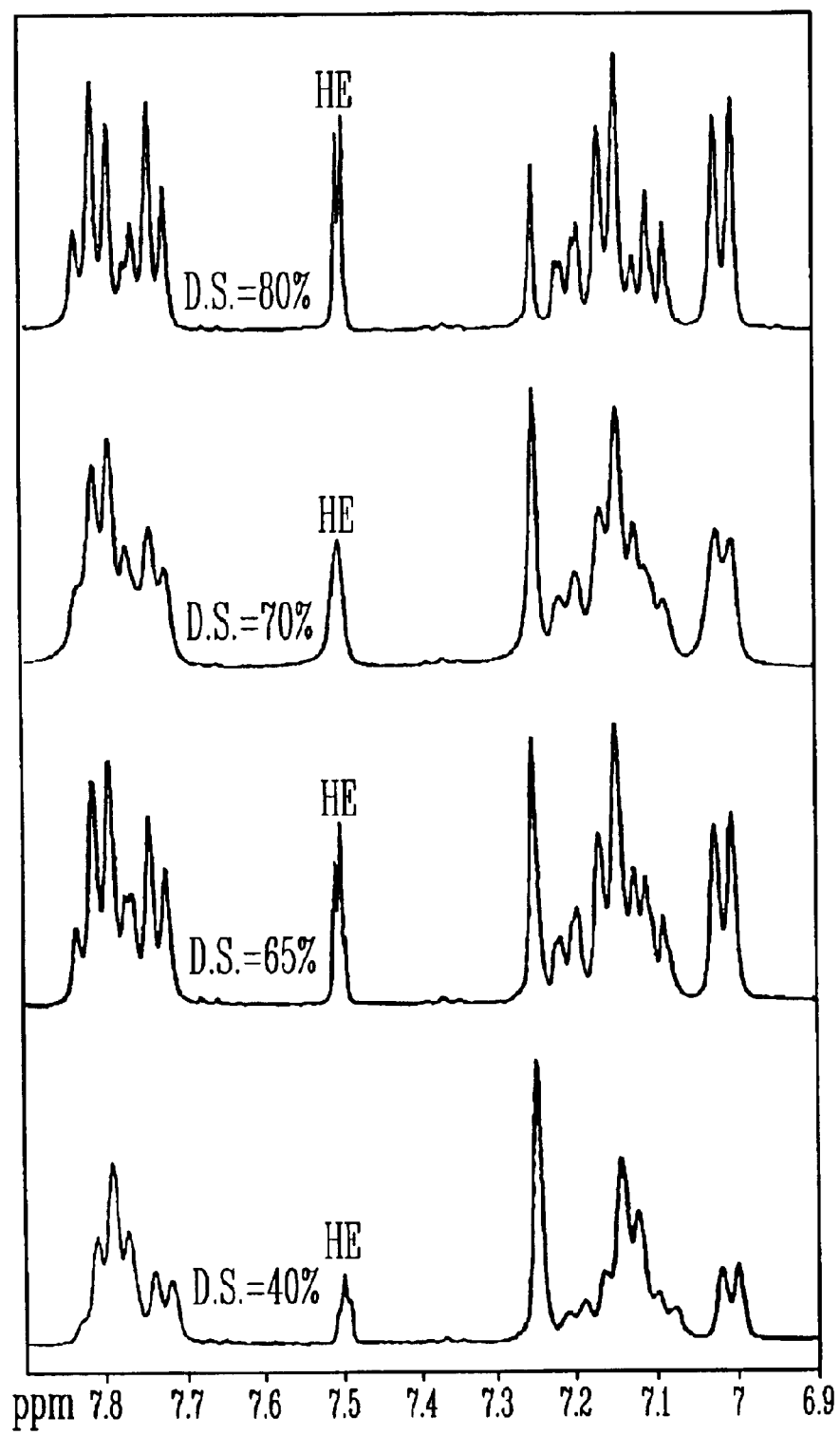
FIG. 2e shows the NMR spectra of differently sulfonated PEEK samples dissolved in DMSO-d6.

The $^1$H NMR spectra of different sulfonated PEEK samples dissolved in DMSO-d6 are shown in FIG. 2e. Since non-sulfonated PEEK is insoluble in any solvent except in strong acids, its $^1$H NMR spectra could not be not recorded. In fact in the low sulfonated SPEEK, several repeat units are unsubstituted and the $H_C$ and $H_C$ of the hydroquinone aromatic ring of PEEK repeat units in the SPEEK polymer appear as a characteristic singlet at 7.25 ppm. The intensity of this singlet decreases as the degree of sulfonation increases. Similarly, two new signals increasing in intensity with higher degree of sulfonation (D.S.) can be clearly observed. They are associated with the hydroquinone ring of the SPEEK repeat unit. $H_C$ is a doublet of doublets at 7.20 ppm and the two $H_{B'}$ protons are a doublet at 7.00 ppm, shifted upfield by proximity of the SO$_3$H group. The multiplicity of $H_C$ doublet of doublets, is caused by its four bond coupling with $H_D$ (2.5 Hz) and its tree bond coupling with $H_D$ (8.8 Hz). The intensities of both $H_C$ and the two $H_{B'}$ increase proportionally with intensity of $H_B$.

Figure 3:
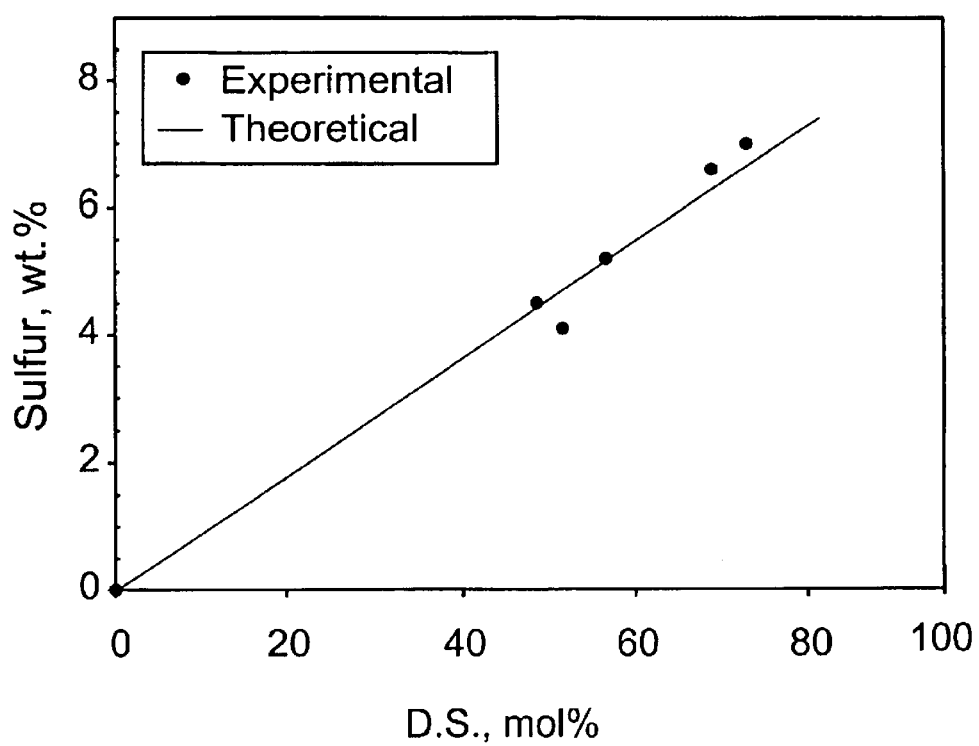
FIG. 3 shows the sulfur content as a function of calculated degree of sulfonation based on the NMR spectra of SPEEK samples.

The D.S. calculated from the $^1$H NMR spectra of SPEEK samples is plotted in FIG. 3. These data are also reported in Table 1 together with the sulfur content, calculated from them, and with results of elemental analysis for sulfur.

TABLE 1

| Sample | Degree of sulfonation (D.S.) by NMR, mol % | Sulfur content (wt. %) Experimental (elemental analysis) | Sulfur content (wt. %) Calculated from D.S. |
|---|---|---|---|
| PEEK | 0.0 | 0.0 | 0.0 |
| SP1 | 48 | 3.90 | 4.3 |
| SP2 | 51 | 4.45 | 4.63 |
| SP3 | 56 | 5.15 | 5.06 |
| SP4 | 68 | 6.60 | 6.08 |
| SP5 | 72 | 7.0 | 6.4 |

Figure 4:
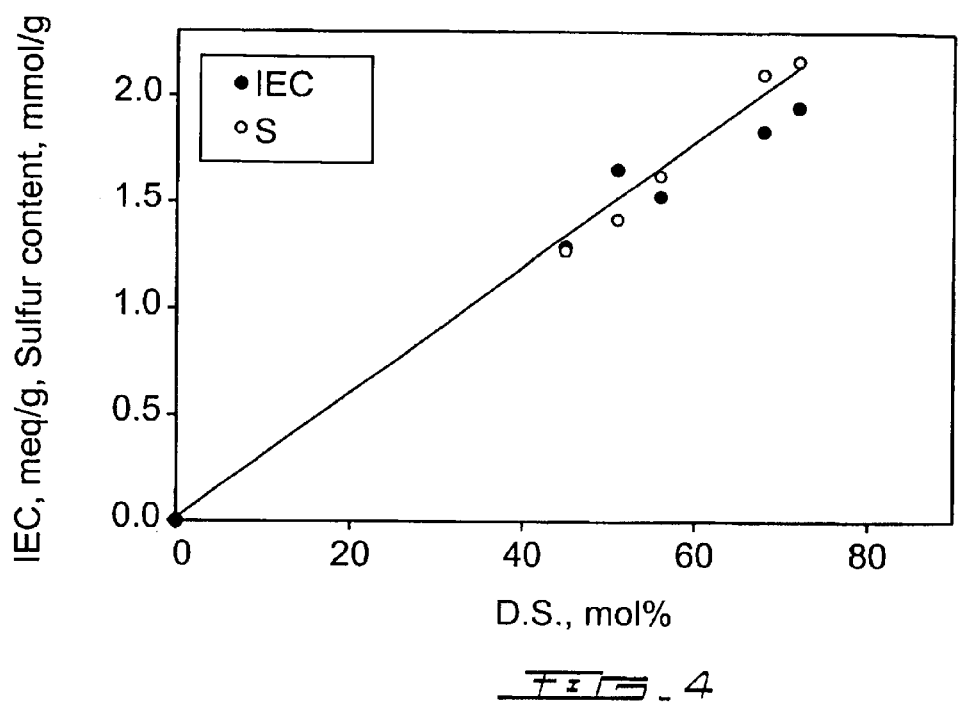
FIG. 4 shows the ion exchange capacity of PEEK as a function of its degree of sulfonation.

As can be seen the sulfur percentage determined experimentally and the one, calculated from the estimated values of D.S., are in reasonably good agreement. The ion exchange capacity (IEC) and the sulfur content expressed in mmol/g, given in FIG. 4, also agree rather well with each other. Thus, as the sulfonation proceeds with time from 24 to 112 hours, ionomers of PEEK having degrees of sulfonation ranging from 40–80 mol % are obtained Using this sulfonation method, even at room temperature the dissolution/reaction of the PEEK granules during a short period of 24 h produced a SPEEK, having 0.4 sulfonic groups per repeat unit.

EXAMPLE 13

Glass Transition Temperature: DSC Studies

Figure 5:
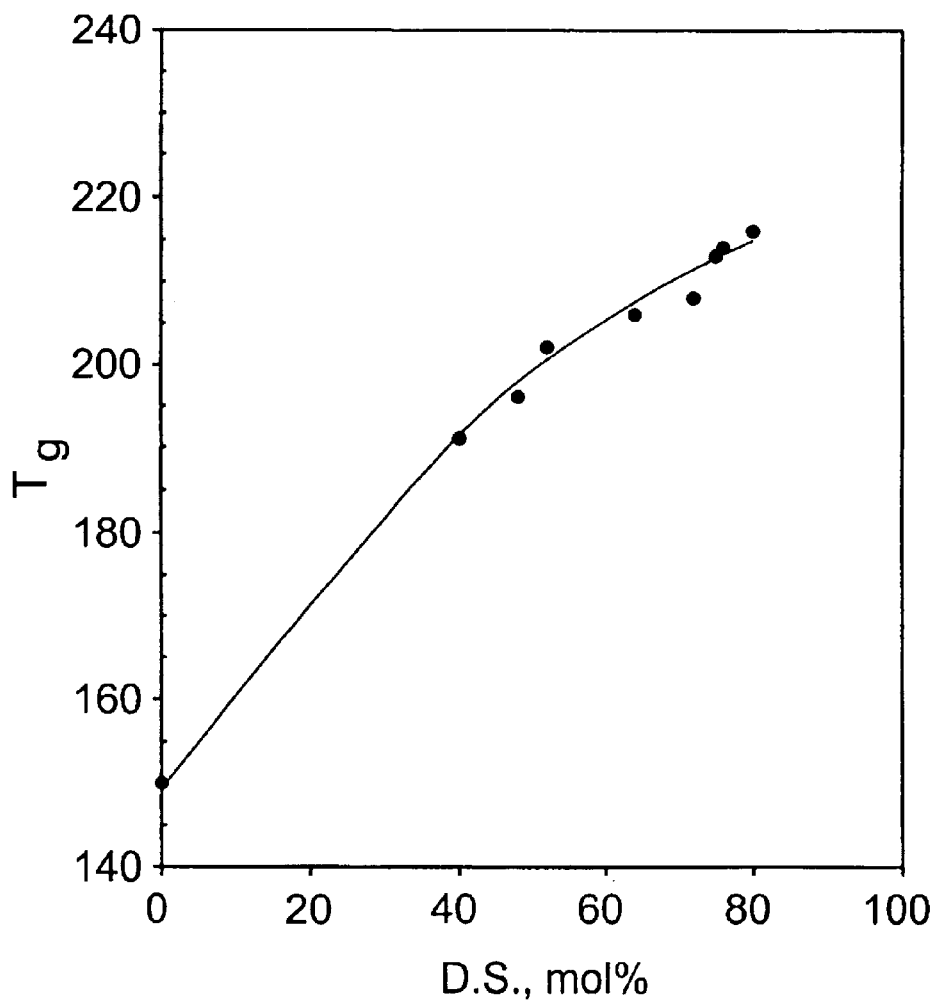
FIG. 5 shows the glass transition temperature of PEEK as a function of its degree of sulfonation.

The values of the glass transition temperature, Tg were determined by the DSC technique at a heating rate of 10° C./min. It is of interest to compare how the D.S. affects Tg of sulfonated PEEK. FIG. 5 displays SPEEK Tg values as function of D.S. As discussed above, it is important to use well purified and carefully dried samples to obtain well defined and reproducible Tg values. For these particular experiments, samples were first dried to 200° C. at a heating (ate of 20° C./min to remove any solvent and water. It was observed that samples were not discolored or degraded. Special care was exercised at this step as even a small quantity of water or solvent acts as a plasticizer and could lead to depressed Tg values. After quenching with liquid nitrogen, the DSC experiments were repeated at a heating rate of 10° C./min to obtain the Tg value.

From FIG. 5, it can be seen that Tg increases monotonically with the degree of sulfonation. Comparing the glass transition results of the sulfonated PEEK samples, it was observed that the introduction of —SO3H groups into the PEEK polymer increased the Tg by as much as 65° C. for the sample having 80% degree of sulfonation relative to Tg of 150° C. for non sulfonated PEEK. These results are in complete agreement with reference [15] for PEEK and similar behavior has also been observed for sulfonated polysulfone [17–20]. The increase in Tg with the degree of sulfonation results from the increased intermolecular interaction by hydrogen bonding of SO3H groups (ionomer effect). Increased molecular bulkiness may also contribute [19]. It is likely that these intermolecular forces hinder the internal rotations compared to unsulfonated PEEK. Interestingly similar conclusions have been reached from the observations that sulfonation increases the molecular dimensions of PEEK in solution [13].

EXAMPLE 14

Thermal Stability: TGA Studies

Figure 6A:
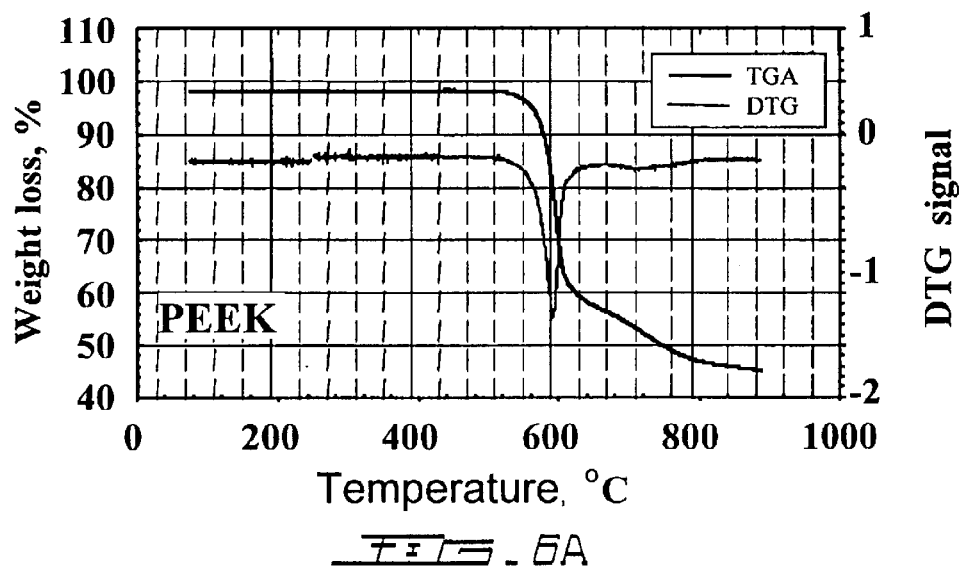
FIG. 6 shows the thermal stability of sulfonated PEEK (FIG. 6b) and pure PEEK (FIG. 6a)
Figure 6B:
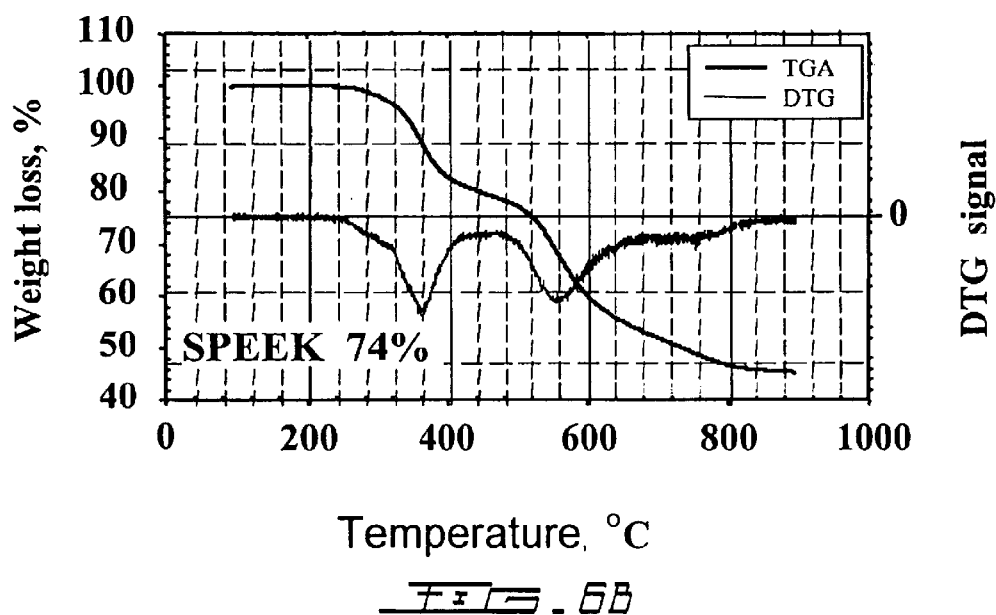

The thermal stability of sulfonated and pure PEEK was investigated by TGA The samples were pretreated at 200° C. and then the experiment was run from 90 to 900° C. at a heating rate of 10° C. /min under flowing nitrogen. Examples of TGA and DTG curves of PEEK and sulfonated PEEK (SPEEK) are shown in FIG. 6. Since PEEK is a high temperature resistant polymer, the onset of significant weight loss for this polymer starts at about 520° C. This Weight loss may be due to the main chain decomposition of the polymer. The degradation takes place through the pyrolysis of PEEK with formation of phenols and benzene. The major pyrolysis product of PEEK, phenol, is produced in the early chain scission reaction involving ether rather than carbonyl-linkages [21].

Figure 7:
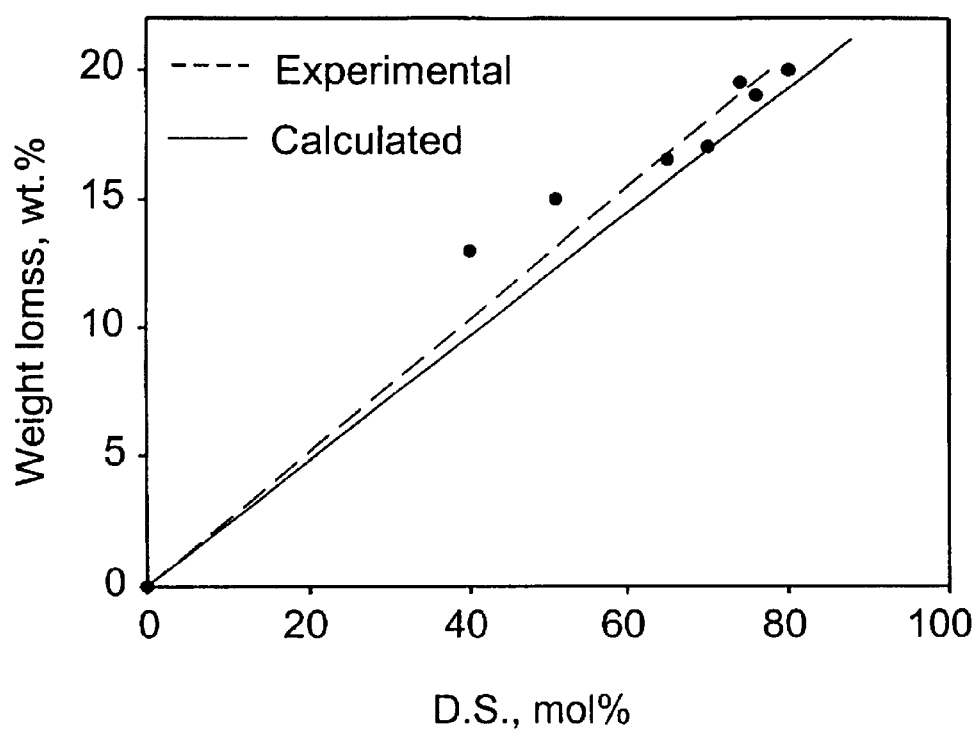
FIG. 7 shows the first weight loss peek of SPEEK as a function of the degree of sulfonation.

From FIG. 6, it can be seen that two weight loss steps are observed for sulfonated PEEK which is reflected by two broad peaks in the DTG curve in two separate temperature ranges in contrast to the one weight loss peak for non-sulfonated PEEK. The first weight loss peak in SPEEK is believed to be due to the splitting-off of sulfonic acid groups. A similar observation was made for sulfonated polysulfones [18,19]. The maximum peak temperature of the second peak for all SPEEK samples shifted to 560° C. from 600° C. for PEEK. The maximum temperature for the peak, corresponding to the sulfonic acid decomposition, was found to be 380° C. in the TGA/DTG for all the sulfonated samples. From the first peak, the weight loss corresponding to the sulfonic acid decomposition was determined (Table 2) and plotted against the degree of sulfonation, as shown in FIG. 7.

TABLE 2

Measured and calculated weight loss of different SPEEK samples due to the splitting-off of sulfonic acid groups

| Sample | Degree of sulfonation by NMR, mol % | Weight loss by TGA, wt. % | Weight loss calculated, wt. % |
|---|---|---|---|
| SN1 | 40 | 13.0 | 10.0 |
| SP2 | 51 | 15.0 | 12.2 |
| SN2 | 65 | 16.5 | 15.3 |
| SN3* | 70 | 17 | 16.4 |
| SN4* | 74 | 19.5 | 17.0 |
| SN5 | 76 | 19.0 | 17.4 |
| SN6* | 80 | 20.0 | 18.2 |

*Polymers used for preparation of the composite HPA/SPEEK membranes

Figure 8:
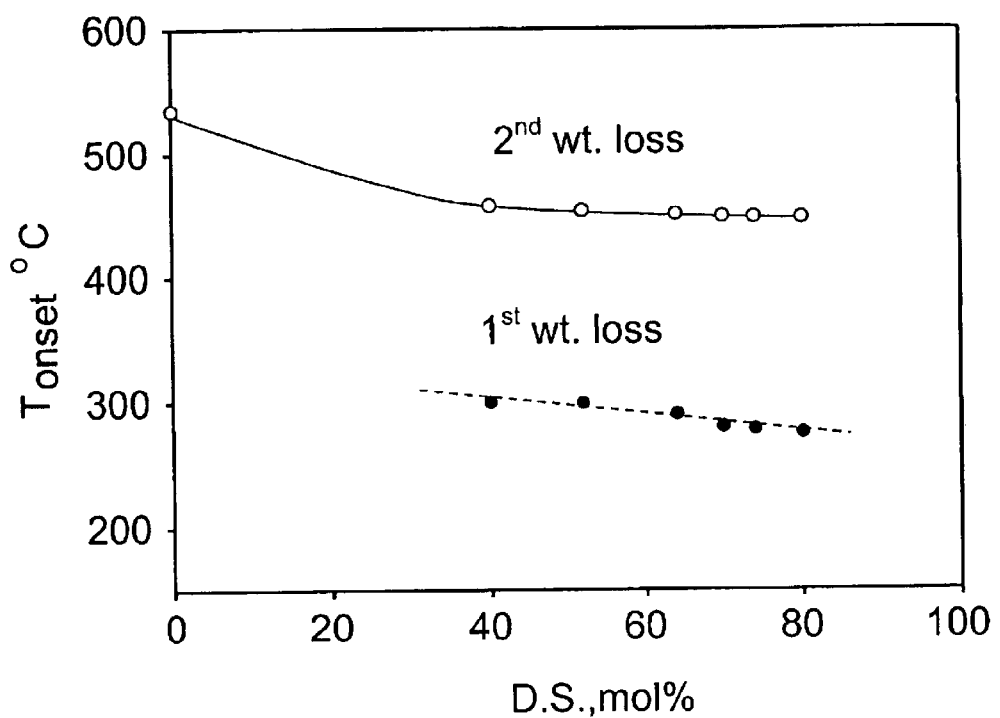
FIG. 8 shows the temperature onset of the first and second weight losses of SPEEK.

The theoretical weight loss calculated assuming that the splitting-off of a sulfonic acid group releases one $SO_3$ molecule, is given in FIG. 7. As can be seen, there is a rather close agreement between the weight loss calculated theoretically and the one determined from TGA experiments for the sulfonic acid decomposition. This indicates that the sulfonic acid introduced by sulfonation is lost in this thermal desulfonation step. The onset temperature of SPEEK, $T_{onset}$ given in FIG. 8, indicates that SPEEK membranes are thermally stable up to approximately 300° C. and that this temperature is only marginally affected by an increase in the degree of sulfonation up to 80%. From the thermal analysis results it can be concluded that the thermal stability of the SPEEK membranes is good and that SPEFK will be stable for fuel cell applications both at low and medium temperatures.

EXAMPLE 15
Water Absorption of SPEEK Membranes

The amount of water absorbed in sulfonated PEEK membranes was determined in two ways as described in the experimental section. The dry SPEEK membranes were immersed in $H_2O$ at room temperature for 24 h until there was no further weight gain, then wiped with blotting paper and weighed. In another experiment the wet membranes were vacuum dried at 100–120° C. and their water loss determined, then they were again soaked in water and weighed after blotting. The vacuum dried membranes when immerse in water for hydration regained the initial weight of the wet membranes within 46 hours.

Figure 9:
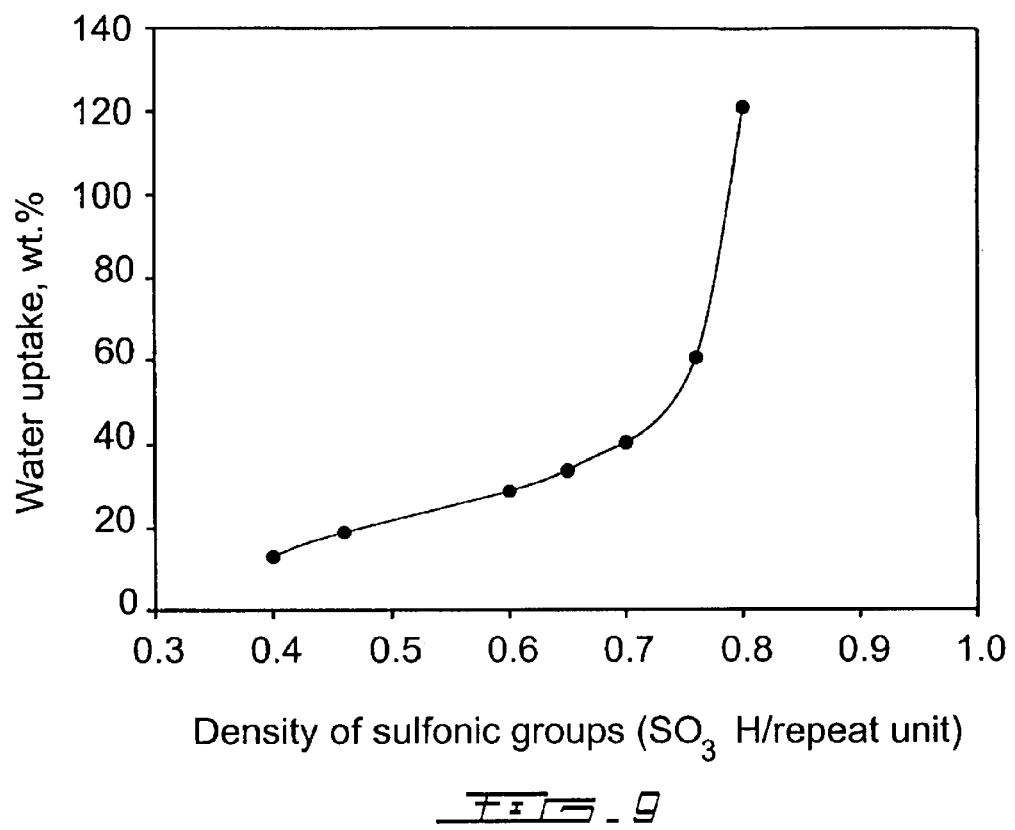
FIG. 9 shows the hydrophilicity of SPEEK as a function of sulfonation.

The main purpose of sulfonating aromatic PEEK is to enhance acidity and hydrophilicity as it is known that the presence of water facilitates proton transfer and increases the conductivity of solid electrolytes. The enhancement of hydrophilicity by sulfonation of PEEK polymer can be followed by water absorption of SPEEK membranes as a function of the degree of sulfonation. In FIG. 9 the mass of water absorbed by SPEEK membranes expressed in wt. % of the dry membrane is plotted against the number of sulfonic acid groups. The water uptake of SPEEK membranes increased with increasing sulfonation level and it reached 120 wt % for a SPEEK membrane of 80% D.S. (containing 0.8 $SO_3H$ group per repeat unit). These results show that the water absorption of SPEEK membranes increased linearly up to a D.S. of 65% and very rapidly above 70%. In the highly sulfonated SPEEK membrane the density of $SO_3H$ group is high and there may be a possibility of clustering (or agglomeration). Clustered ionomers absorb more water, therefore a large water uptake may be suggestive of the presence of ion-rich regions [14]. These results are important as proton conduction depends on the presence of water in the polymer structure.

A similar trend was observed for the water content of Ballard's BAM3G membranes [6,7], which showed an increase in water content with equivalent weight (EW) decreasing from 920 to 375, where the EW is expressed as g/mol-SO3. The water uptake in BAM3G membranes increased exponentially below 410 EW to more than 250%. So in fact a decreased EW corresponds to a higher D.S. which brings about an increase in water content This is similar to our results where the water content increased linearly with an increase in sulfonic group density up to a D.S. of ca.65% and then increased exponentially. The water content of our SPEEK membranes is higher than in $NAFION_2117$ membranes (34%), DOW membranes (56%), NASTA membranes (48%)/7/ and polyamide membranes (30%) [22/]. This high water adsorption capacity of SPEEK membranes compared to others is also a characteristic of BAM3G membranes. Consequently, both BAM and SPEEK membranes should be equally efficient in DMFC water management.

EXAMPLE 16
Scanning Electron Microscopy

The morphology of the composite SPEFK/HPA membranes has been studied by scanning electron microscopy. The SEM micrograph of the cryogenic fracture of a composite membrane is presented in FIG. 10. It can be seen from this micrograph that the solid HPA is well mixed with SPEEK and shows no agglomeration after membrane preparation. High magnification micrographs of these membranes indicate that HPA particles are homogeneously distributed within the SPEEK polymer.

EXAMPLE 17
Conductivity Studies

Figure 11:
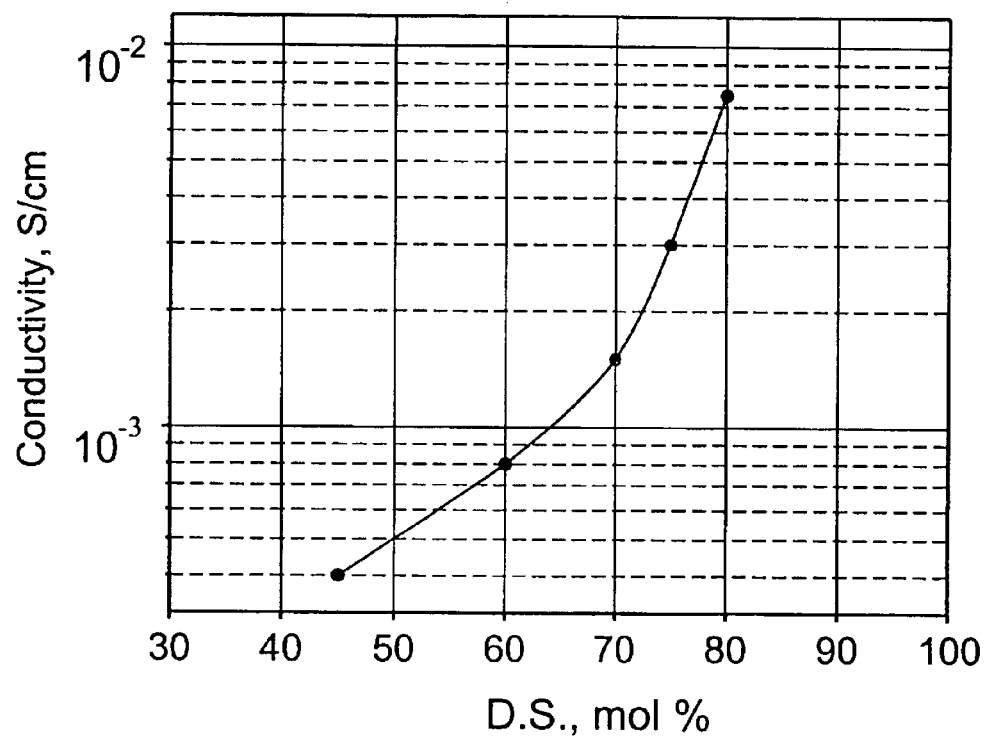
FIG. 11 shows the effect of the degree of sulfonation on the conductivity of SPEEK membranes at room temperature.

Membranes were prepared from the SPEEK polymer, characterized in Examples 12 to 16, by casting from a solution of polymer in dimethylacetamide. The various membranes obtained had a thickness ranging from 300- to 500 (m and a degree of sulfonation ranging from 40- to 80%. The proton conductivity of these differently sulfonated SPEEK membranes was measured in the transverse mode as described in EXAMPLE 10. Prior to conductivity measurements all the membrane samples were soaked in water for hydration. The effect of the degree of sulfonation on the conductivity of SPEEK membranes at room temperature is shown in FIG. 11. The conductivity was found to increase with the degree of sulfonation and reached a value of $8 \times 10^{-3}$ S/cm for the membrane with 80% degree of sulfonation. With the increase in the number of sulfonic acid groups in the SPEEK polymers, there is an enhancement in their solubility in organic solvents e.g. water mediated pathways for protons. Proton conductivity depends also on such factors as density and distribution of sulfonic acid sites, degree of dissociation of sulfonic acid functions and some others.

Figure 12:
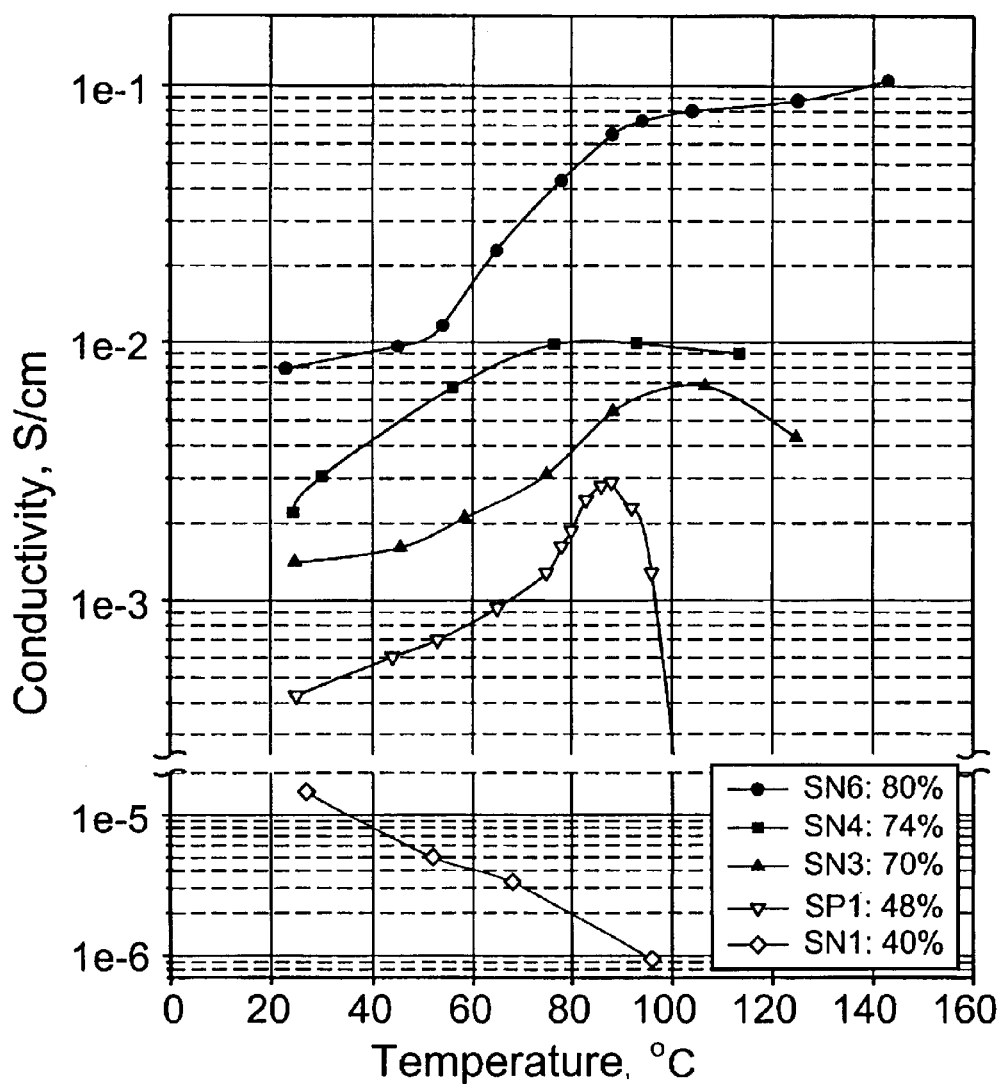
FIG. 12 shows the effect of temperature on the conductivity in a series of SPEEK membranes having different degrees of sulfonation.

The dependence of the conductivity on temperature for a series of SPEEK membranes at different D.S. is presented in FIG. 12. As can be seen, the conductivity depended substantially on temperature and this dependence is strongly affected by the sulfonation level. The membrane sulfonated at 40% did not show any improvement in conductivity with temperature, which on the contrary even decreased with temperature rise. The conductivity of the membrane sulfonated at 48% increased up to 85° C. and then dropped sharply to very low values. As to membranes sulfonated al 70 and 74%, they showed a continuous increase in conductivity and a gradual decrease beginning only above 100° C. The conductivity of the membrane sulfonated at 80% behaved differently with temperature than the others. It increased slowly in the temperature range of 20–50° C., showed a fast rise in the 50–100° C. range and then gradually increased up to 145° C.

The temperature dependence of SPEEK conductivity indicates the presence of two competing trends, one of which enhances the conductivity and the other which reduces it. As ionic conductivity of electrolytes is in general thermally stimulated, it is natural to expect a rise in proton conductivity with temperature. The decay in the conductivity curves above a certain temperature, which is observed (FIG. 12) for all but one SPEEK samples, suggests that there is dehydration of the polymers during the measurements. One can see that this dehydration starts at room temperature for 40%SPEEK, and then shifts towards higher temperatures as D.S. increases. This indicates, that it is not only the water uptake which depends on the sulfonic group content (FIG. 9), but also the capacity of the membrane to retain water. The sample with 40% D.S. for instance, loses water so fast that dehydration suppresses any conductivity rise. With an increase in D.S. the conductivity curves show a less steep decline, and for 80%SPEEK water retention is so high that dehydration induces only a decrease in the conductivity rising rate up to 145° C. Since the low sulfonated membranes were not found to maintain high conductivity at temperatures higher than 90° C., the SPEEK polymers sulfonated at 70–80% were selected as matrix for the preparation of composite membranes with heteropolyacids.

EXAMPLE 18

Preparation of the SPEEK/HPA Composite Electrolyte Membrane and Properties Thereof Composite SPEEK/HPA membranes were prepared by incorporation of 60 wt % HPA (TPA, MPA and Na-TPA) into three SPEEK matrices with 70, 74 and 80% degree of sulfonation. The thickness of these composite membranes varied from 150 to 300 µm (Table 3).

TABLE 3

Conductivity and water absorption of the composite membranes

| Membrane designation | Membrane Type | Thickness of wet membrane, µm | Water-uptake, wt. % | Conductivty, S/cm 25° C. | 100° C. |
|---|---|---|---|---|---|
| SN3 | Pure SPEEK 70 | 300 | 48 | $1.3 \times 10^{-3}$ | $6.7 \times 10^{-3}$ |
| HPA1 | SPEEK 70 + TPA | 170 | 64 | $3.5 \times 10^{-3}$ | $1.7 \times 10^{-2}$ |
| HPA2 | SPEEK 70 + Na-TPA | 375 | 143 | $2.9 \times 10^{-3}$ | $1.5 \times 10^{-2}$ |
| HPA3 | SPEEK 70 + MPA | 200 | 94 | $3.1 \times 10^{-3}$ | $1.2 \times 10^{-2}$ |
| SN4 | Pure SPEEK 74 | 300 | 62 | $2.1 \times 10^{-3}$ | $9.5 \times 10^{-3}$ |
| HPA4 | SPEEK 74 + TPA | 160 | 190 | $5.1 \times 10^{-3}$ | $2 \times 10^{-2}$ |
| HPA5 | SPEEK 74 + NaTPA | 300 | 160 | $4.5 \times 10^{-3}$ | $1.6 \times 10^{-3}$ |
| HPA6 | SPEEK 74 + MPA | 200 | 146 | $3.6 \times 10^{-3}$ | $1.2 \times 10^{-2}$ |
| SN6 | Pure SPEEK 80 | 500 | 120 | $8.0 \times 10^{-3}$ | $7.6 \times 10^{-2}$ |
| HPA7 | SPEEK 80 + TPA | 300 | 600 | $2 \times 10^{-2}$ | $9.5 \times 10^{-2}$ |
| HPA8 | SPEEK 80 + NaTPA | 200 | 400 | $1.4 \times 10^{-2}$ | $5.8 \times 10^{-2}$ |
| HPA9 | SPEEK 80 + MPA | 160 | 320 | $1.2 \times 10^{-2}$ | $3.0 \times 10^{-2}$ |

Figure 13:
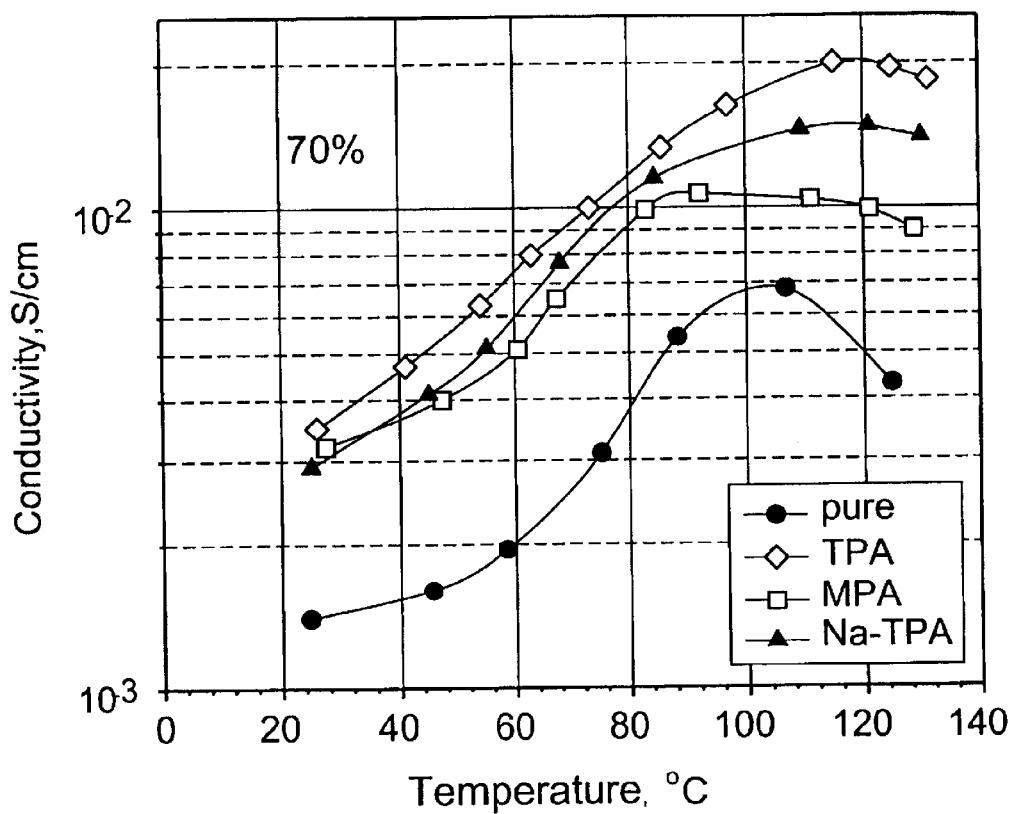
FIG. 13 shows the effect of solid HPA incorporation and temperature on the conductivity of a SPEEK/HPA composite membrane having a 70% degree of sulfonation.
Figure 14:
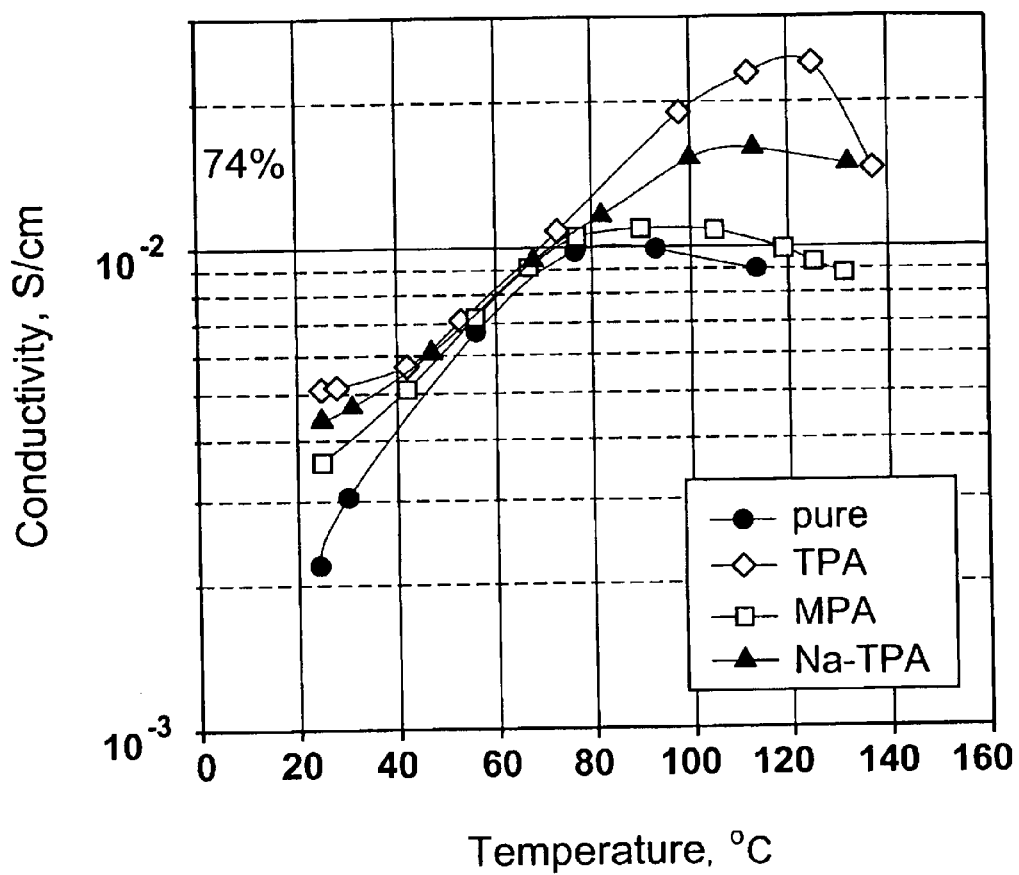
FIG. 14 shows the effect of solid HPA incorporation and temperature on the conductivity of a SPEEK/HPA composite membrane having a 74% degree of sulfonation.
Figure 15:
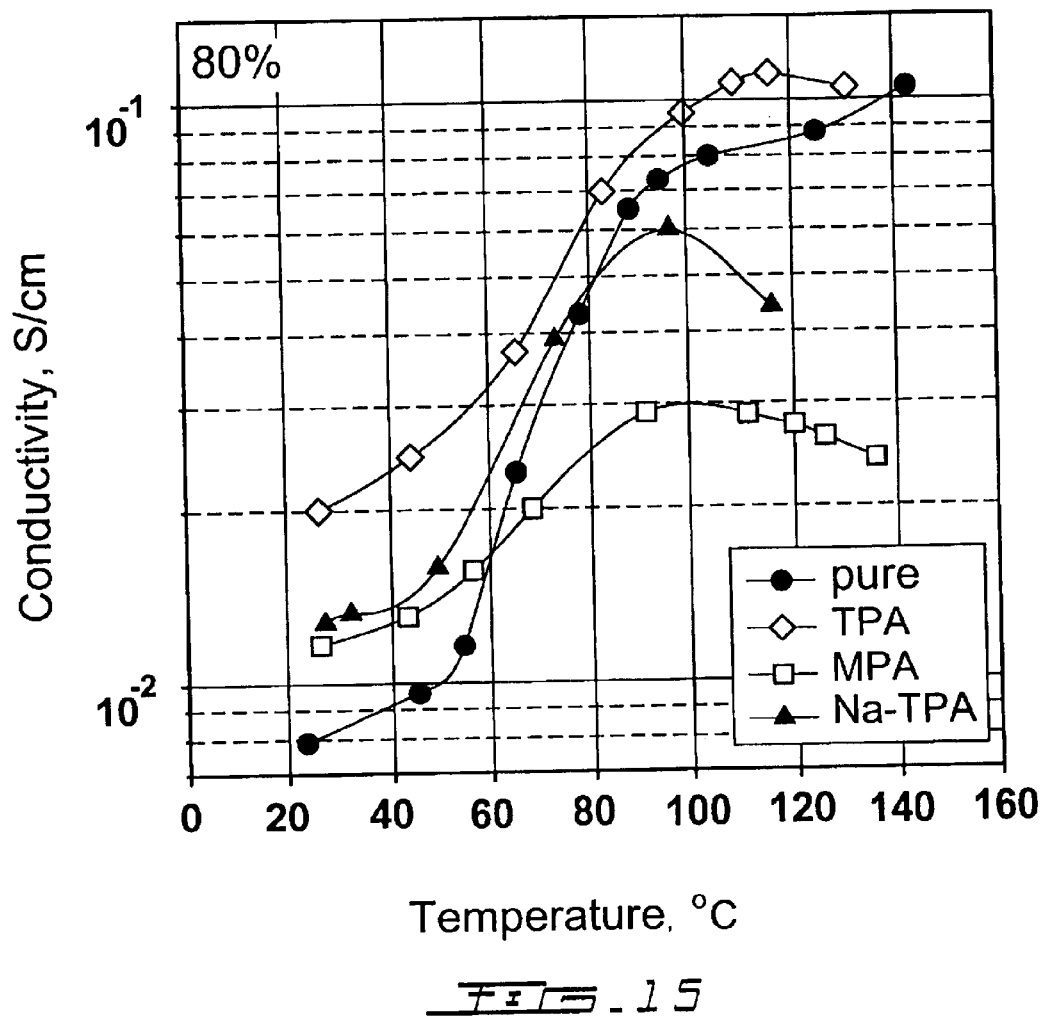
FIG. 15 shows the effect of solid HPA incorporation and temperature on the conductivity of a SPEEK/HPA composite membrane having an 80% degree of sulfonation.

The conductivity of the composite membranes was measured in the transverse direction at temperatures ranging from 20 to 150° C. The results of conductivity measurements, showing the effects of solid HPA incorporation and temperature on the conductivity of these composite membranes, are given in FIGS. 13–15. They are presented for three different sets of composite membranes, containing various solid HPAs within each of the three SPEEK matrices. Incorporation of HPAs increased the membrane conductivity compared to the pure membrane, except in the case of the 80% sulfonated PEEK for which only the TPA/SPEEK membrane showed enhanced conductivity at temperatures higher than 80° C. In all cases the introduction of the HPA's improves the high temperature stability of the conductivity. The conductivity of all the composite membranes behaved in a similar fashion; the TPA based membranes showed a higher conductivity than Na-TPA and MPA composites. It appears that TPA, being a stronger acid, yields systematically a higher proton conductivity increase as well as a better water retention at high temperature.

These results show that by incorporation of HPA into SPEEK the conductivity was raised up to values, close to that of pure HPA. Hydrated wafers of TPA 13 mm in diameter and 0.5–2 mm thick at ambient temperature exhibited a high conductivity of $1.9 \times 10^{-1}$ S/cm [11,12]. The highest conductivity of $1.5 \times 10^{-1}$ S/cm was obtained for composite membrane containing TPA in 80% sulfonated SPEEK at 120° C. These results clearly show that it is possible to increase significantly the proton conductivity of SPEEK, matrices by incorporation of a solid inorganic acid such as solid HPAs.

The water uptake at room temperature and the conductivity of some of these membranes along with their thickness are given in Table 3. The water uptake of the composite membranes increased upon incorporation of hydrophilic solid HPA into SPEEK matrices. It can be noted that the pure SPEEK membrane at 80% sulfonation shows higher conductivity above 100° C. than its composite membrane containing MPA or Na-TPA (FIG. 15) The pure SPEEK 80 membrane has a thickness of 500 μm which is three times higher than the MPA composite membrane (160 μm) and more than twice the thickness (200 μm) of the Na-TPA containing membrane. The moisture retention and dehydration rate can be affected by the thickness of the membranes. The thicker membranes will thus have higher moisture retention and lower dehydration rate upon heating, than the thinner membranes. At the same time the positive effect of HPA introduction can be clearly seen at temperatures below 60° C. for MPA and below 80° C. for Na-TPA. This difference can also be attributed to the different membrane thickness.

Comparing these results with studies by Park et al [23] for sulfonated polysulfone membranes containing solid TPA, where the conductivity of $1.6 \times 10^4$ S/cm was registered, the proton conductivity displayed by HPA-SPEEK membranes proved to be significantly higher. In a work of Tazi & Savadogo [24] a conductivity of $9 \times 10^2$ S/cm was reported for $H_2SO_4$ acidified NAFION-silicotungstic based membranes. Despite The fact that only fluorine-free materials were used, the membranes reported in this work exhibited conductivities of the same order of magnitude. Thus, the membranes of the present invention show conductivities which are comparable to those of NAFION and NAFION-derivatives but provide the advantage of being fluorine-free and environmentally friendly.

From the results of water absorption it can be noted that the water content of the SPEEK membranes increases with D.S. At the same time Tg also increases, reflecting an increased intermolecular association through the polar ionic sites. The increasing association of the PEEK repeat unit with the anionic counter charge ($SO_3$) immobilized on the polymer backbone of a neighboring chain suggests a less effective separation of the aqueous phase compared to NAFION. This increased association is not however sufficient to upset the effect of the increased water content, which brings about an increase in conductivity of SPEEK membranes. The proton conductivity in aromatic membranes depends much more on the amount of water as second phase than in the case of NAFION [25]. The higher water content of these membranes helps the migration of proton, which involves such species as $H_3O^{30}$ and $H_2O_5^{30}$, needed for conduction.

Figure 10:
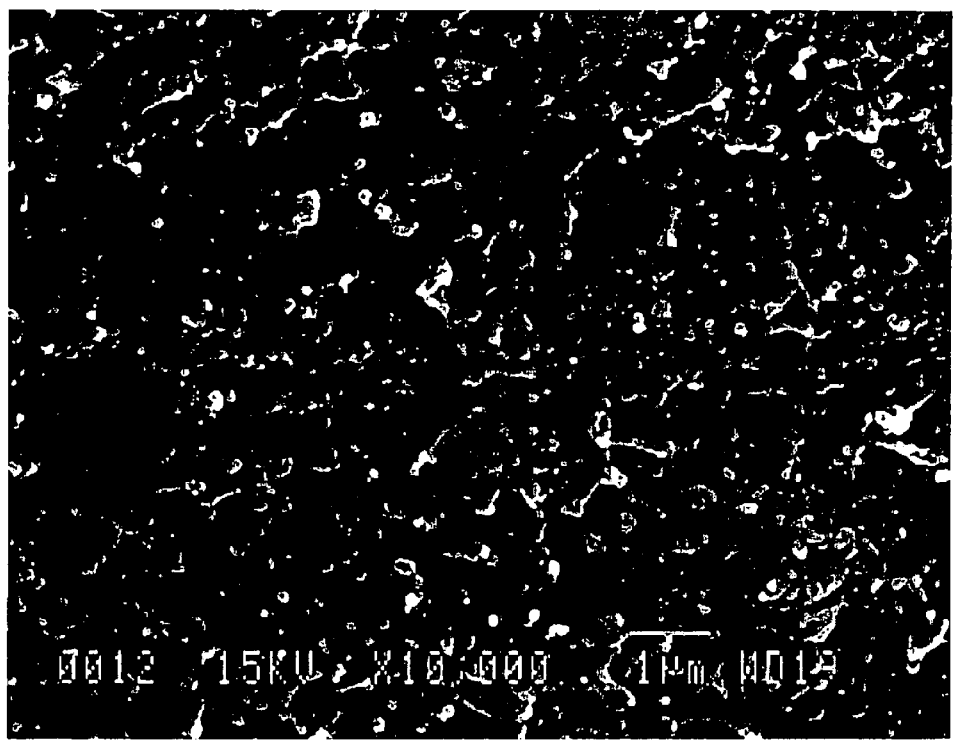
FIG. 10 shows a micrograph of the cryogenic fracture of a composite SPEEK/HPA membrane.

The composite membranes containing HPAs display higher Tg than the pure SPEEK membranes. For composite membranes containing TPA and MPA in 70% sulfonated SPEEK for example the glass transition temperature increased from 208° C. to 215° C. The glass transition of the composite membrane not only on the sulfonation level but also on the type of solid acid HPA. This increase in Tg of the composite membranes may be due to a reduction in chain mobility most probably caused by the interaction of the solid acid with polar groups of the SPEEK polymer chain [17]. Such interactions are also consistent with the SEM micrographs of the composite membranes, which show solid HPA homogeneously mixed with the SPEEK polymer phase (FIG. 10). These pictures suggest that the conductivity of these composite membranes is favored by the uniform spatial distribution of HPA particles which minimizes interparticle distances. In addition SPEEK, being a conductive polymer, is acting as an effective binder for HPA particles contributing to the conduction process.

The water content of these composite membranes was also found to increase over the pure SPEEK membranes. The water uptake (Table 3) of composite membranes based on 70% sulfonated SPEEK increases from 48% to 143%, for composite membranes based on 74% sulfonated SPEEK increased from 62% to 190%, and the water uptake of the composite membranes based on 80% SPEEK increased to high value from 120 to 600%.

It is worth noting however, that the increased water uptake associated with the incorporation of HPAs to the polymer matrix is only one factor affecting the membrane conductivity. Other factors, including the polymer intrinsic conductivity, strength, density and softness of the solid acid sites, the solid phase loading, particle size and spatial distribution, the aqueous phase dispersion, all membranes which are described as a nanoporous inert "sponge" for water of hydration, this water shows little interaction with the polymer chain and forms hydration shells around the sulfonic acid groups [25]. In HPA/SPEEK membranes the aqueous phase is more continuous. This leads to higher water uptake (swelling) an contributes to a greater extent to proton conductivity.

Figure 16:
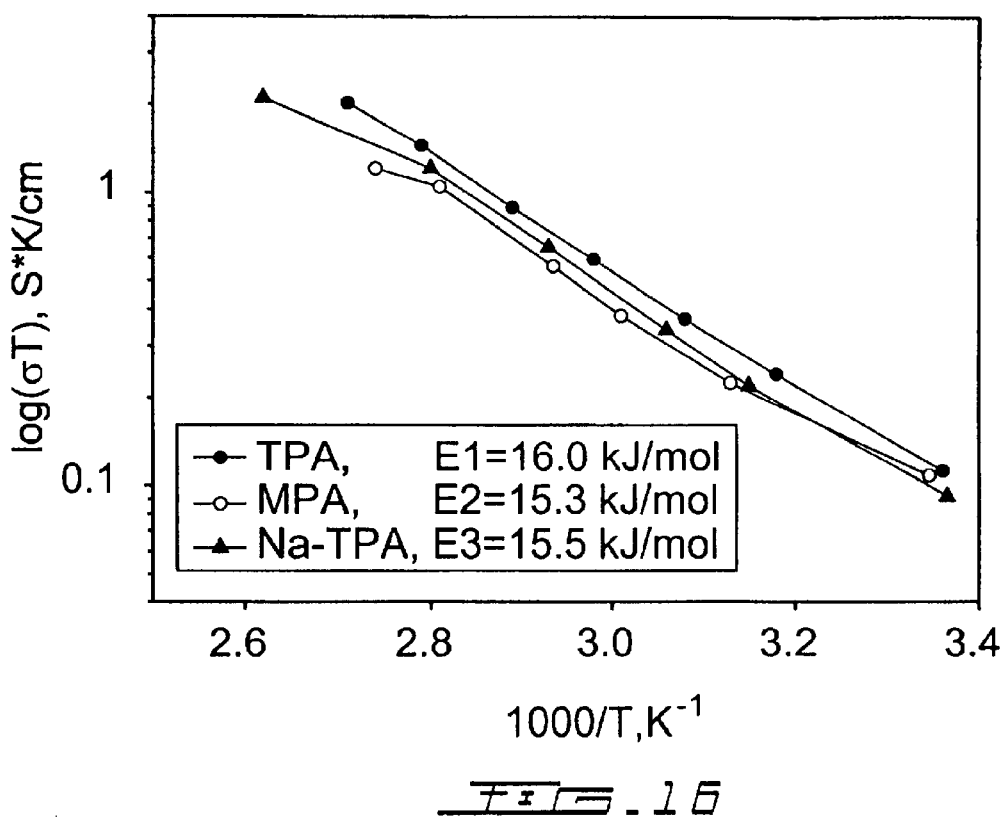
FIG. 16 shows the Arrhenius plots of conductivity for the 70% SPEEK-based composite membranes-embedded HPA.

Examples of Arrhenius plots of conductivity for the 70% SPEEK based composite membranes are given in FIG. 16. For all composite membranes reported here, the activation energy for proton conduction was similar and close to 15 kJ/mol, This result suggests a common charge transfer mechanism. The relatively low measured values of activation energy are suggestive of a liquid like mechanism most probably based on the Grotthus reorientational proton transfer scheme [4].

Of note, the conductivity of composite membranes was not affected by storage in water at room temperature for nine months. SPEEK polymer is, therefore, acting as an effective polymer matrix for solid HPA. Taken together, the results presented herein show that composite membranes containing solid HPA are stable for the long term, with no change in their conductivity These composite membranes possess good stable mechanical strength and flexibility except the ones based on SPEEK sulfonated at 80% which become weak because of excessive swelling The best mechanical properties were found with the 70% sulfonated SPEEK based composites.

Conclusion

In this example a series of composite membranes have been prepared by incorporation of tungstophosphoric acid, its disodium salt and molybdophosphoric acid into partially sulfonated PEEK polymer. These membranes exhibited a rather high conductivity of $10^{-2}$ S/cm at ambient temperature and maximum of above $10^{-1}$ S/cm above 100° C. The DSC studies of these membranes for the glass transition temperature showed an increase in its value due to the incorporation of both sulfonic acid groups and the solid HPA into the PEEK polymer. The increase in Tg of the composite membranes compared with the Tg of pure SPEEK suggests an intermolecular interaction between SPEEK and HPAs. These membranes are thermally stable up to (275° C., mechanically strong and flexible. They preserve the high conductivity during storage in water for several months. These membranes are easy to prepare, are much less expensive than the commercial perfluorinated membranes and are fluorine-free. The high proton conductivity combined with their long term stability qualify the HPA/SPEEK composite membranes to be considered for use in PEM fuel cells as alterative to NAFION membranes.

EXAMPLE 19

The proton conductivity (σ) of aluminum boron phosphate was measured using impedance spectroscopy. It was found to be inversely related to the Al/B ratio and calcination temperature, and drastically increased with adsorbed water content. The water assisted conductivity of low aluminum Al-BPO4 was registered to be approaching as high as 10−2 S cm−1. At the same time partial replacement of B with Al in boron phosphate substantially enhanced its stability in aqueous surrounding, it appears that the Al addition suppresses the formation of completely hydrolyzed species and thereby increases inertness of solid towards water.

Samples of Al-BPO$_4$ were prepared from boehmite, orthophosphoric and boric acids. First the appropriate amount of boehmite was dissolved in hot H$_3$PO$_4$ and then H$_3$BO$_3$ was added To the solution. It was stirred continuously in a crystallizing pan at 120° C. in the air until a thick mass was formed, which was then kept without string at the same temperature for 6 hours. The obtained solids were calcined for 12 h in air at 400–1000° C., ground and a powder of <60 mesh grade was separated by sieving. A stoichiometric BPO$_4$ was prepared in a similar manner to be used as a reference throughout the work. The list of the prepared Al containing samples is reported in Table 4, along with the results of the X-ray diffraction analysis.

TABLE 4

Phase composition of Al—BPO$_4$ samples

| (B + Al)/P | Al/B | Sample Designation | Phase composition | $I_x/I_{BPO_4}$* |
|---|---|---|---|---|
| 1.0 | 2:98 | 2BAP100 | BPO$_4$ | — |
| | | | BP$_2$O$_3$ | |
| | 5:95 | 5BAP100 | BPO$_4$ | — |
| | | | Al(PO$_3$)$_3$ | 0.32 |
| | 10:90 | 10BAP100 | BPO$_4$ | — |
| | | | AlPO$_4$ | 0.21 |
| | | | Al(PO$_3$)$_3$ | 1.0 |
| | 20:80 | 20BAP100 | BPO$_4$ | — |
| | | | AlPO$_4$ | 0.73 |
| | | | Al(PO$_3$)$_3$ | 2.71 |
| 0.9 | 5:85 | 5BAP90 | BPO$_4$ | — |
| | | | AlPO$_4$ | 0.09 |
| | | | Al(PO$_3$)$_3$ | 0.52 |
| | 10:80 | 10BAP90 | BPO$_4$ | — |
| | | | AlPO$_4$ | 0.24 |
| | | | Al(PO$_3$)$_3$ | 1.86 |
| | 20:70 | 20BAP90 | BPO$_4$ | — |
| | | | AlPO$_4$ | 1.61 |
| | | | Al(PO$_3$)$_3$ | 3.0 |
| | 30:60 | 30BAP90 | BPO4 | — |
| | | | AlPO | 6.36 |
| 1.2 | 30:90 | 30BAP120 | BPO$_4$ | — |
| | | | AlPO$_4$ | 3.24 |

*$I_x$—Main peak areas of B$_2$O$_3$(1$_{c-321}$), AlPO$_4$ (I$_{a-408}$) and Al(PO$_3$)$_3$ (I$_{a-546}$).
As $I_{BPO4}$ the peak of 4% in the BPO$_4$ pattern (d = 3.07Å) is taken (marked with * in FIG. 1).

Powder X-ray diffraction spectra of the pelletized samples were recorded with a Philips diffractometer using Cu-Kα irradiation with a step size of 0.02 degrees and a count time of 1.2 s per point.

Water adsorption experiments were carried out using an AD-2 microbalance (Perkin-Elmer) equipped with a temperature/atmosphere controlled cell. About 0.2 g of solid was dried at 350° C. following which some water was introduced at room temperature into the cell in order to ensure 100% relative humidity (RH). A constant weight was usually reached over a period of 12–24 h.

The details of MAS-NMR measurements are described in Mikhailenko et al. 1998 (supra). The $^{11}$B, $^{31}$P, $^{27}$Al and $^1$H MAS NMR spectra have been acquired at room temperature using a Bruker-300 spectrometer with 4 mm zirconia rotors spun at 11 kHz. Chemical shifts were respectively referred to BF$_3$O(C$_2$H$_5$)$_2$, 85%H$_3$PO$_4$, aqueous solution of Al(NO$_3$)$_3$ and tetamethylsilane (TMS), used as external standards.

Dehydration of the samples of Al-BPO$_4$ has been carried out prior to MAS-NMR measurements directly m the rotor at 200° C. in vacuum for 4 hours. In order to obtain re-hydrated samples, those were exposed to saturated water vapor (100%RH) in a desiccator at room temperature overnight.

The impedance spectroscopy measurements were performed at ambient temperature over the frequency range 1 to 10$^7$ Hz with oscillating voltage 100 mV, using SI 1260 impedance/gain-phase analyzer (Solarton). The impedance data were corrected for contribution from the empty and short-circuited cell.

The high affinity of Al-BPO$_4$ for water was a barrier to the application of a conventional method [27] of measuring the conductivity of compressed pellets at controlled RH. Storage of pellets of some Al-BPO$_4$ samples at 100%RH yielded a soft, difficult to handle mass. Therefore, we used the following procedure to measure the conductivity of powders. Measured amounts of solid (about 0.5 g) and water were mixed together on a balance and immediately placed in a glass tube, where it was compressed between faces of two brass pistons used as electrodes with a pressure of 10 kg/cm$^2$. The tube inner diameter was 6 mm and the length of a sample was about 10 mm. Each sample was weighed together with the glass tube before and after the impedance test in order to detect any decrease in water content. Since the duration of acquisition of an impedance spectrum did nor exceed Three minutes, the water content did not change much and the error in the estimation of water content was within ca 20%. The procedure of impedance measurement was repeated twice or three times and average values of conductivity as function of the water/solid weight ratio were calculated from the data obtained.

Phase Composition and Solubility

The results of X-ray diffraction analysis for some of the samples studied herein showed that the diffraction pattern of stoichiometric BPO$_4$ used as reference contains only peaks, arbitrable to tetrahedral BPO$_4$ (JCPDS pattern 34–132). These peaks were also the dominant component in the X-ray diffraction patterns of all Al-BPO$_4$ samples.

The XRD pattern of 2BAP100 displayed also the main lines of B2O3 corresponding to d=6.08, d=3.21 and d=2.92 of JCPDS reference pattern 6–297. The other Al-BPO$_4$ samples evidenced the presence of aluminum phosphate AlPO$_4$ and ultraphosphate Al(PO$_3$)$_3$ (JCPDS reface diffraction pattern 11–500 and 13–266 respectively). The phase composition of the Al-BPO$_4$ samples is presented in Table 4. The peak intensity ratios for aluminum phosphate main lines referred to BPO$_4$ reflection at d=3.07 (a peak in the BPO$_4$ pattern with T=4% are also shown in Table 4. Not claiming this approach as quantitative, it nevertheless gives an idea of the order of magnitude for the phase ratios in the solids.

It is evident from Table 4 that as Al/B ratio rises, first ultraphosphate Al(PO$_3$)$_2$ and the phosphate AlPO$_4$ phases appear and their contents gradually increase. At high Al/P ratio (sample 30BAP90) and when the (B+Al)/P stoichiometry is shifted to the (B+Al) side (sample 30BAP120) ultraphosphate was not registered and the phase composition comprised essentially BPO$_4$ and AlPO$_4$.

The impact of Al in addition to changes in the phase composition of the specimens, showed an alteration of the structure of BPO$_4$ itself as assessed by variations in the lattice parameters. This brings about an increase in unit cell volume by about 0.9% over the range of concentration studied here.

In order to determine how The incorporation of Al into the BPO$_4$ lattice and the existence of the aluminum phosphates affects the stability of BPO$_{44}$ in aqueous sounding, the solubility of the specimens was measure. The test was carried out according to the procedure described elsewhere [in Mikhailenko et al, 1998 (supra)], which comprised stirring a 1 wt. % slurry of the solid in distilled water for 15 h, followed by separation of the transparent liquid aliquot from the precipitated solid, its evaporation and weighing of the soluble solid residue. It is seen from FIG. 17 that the thermal treatment dramatically decreases the apparent solubility of Al-BPO$_4$, reducing it to less than 4% at any composition after calcination at 1000° C. in exactly the same manner as for BPO$_4$. Comparing the solubility of the Al-BPO$_4$) samples, calcined at lower temperature, with that of BPO$_4$ indicates, that the aluminum boron phosphates are essentially less soluble. Thus, introducing the aluminum enhanced the stability of boron phosphate in water.

Electrical Conductivity

The conductivity of the samples was calculated from their resistance which was derived from the extrapolated low intersect of the high frequency semi-circle on a complex impedance plane with Re(Z)-axis, (data not shown). These values usually were in good agreement with the ordinates of the plateaus in the Bode plot of conductivity (Re(Y) vs frequency). FIG. 18 presents the electrical conductivity of Al-BPO$_4$, preliminary calcined at 400° C. and 1000° C., as function of water content. Measurements were performed at room temperature. The arrows in the figure indicate the average values of water uptake by the solids conditioned at 100%RH and room temperature. These values depend mainly on calcination temperature but vary within rather narrow limits of about 5% for the solid compositions studied here. It is clear from the figure that the conductivity of Al-BPO$_4$ is sensitive to adsorbed water. It increases with water/solid ratio from $10^{-7}$ to $8\times10^{-3}$ S cm$^{-1}$ for specimens calcined at 400° C. The conductivities of the solids calcined at 1000° C. change over a smaller range of values from $10^{-6}$ up to $10^{-3}$ S cm$^{-1}$. The specimens, calcined at higher temperature, showing the water uptake of ca 6% at 100%RH, are much less hydrophilic than the ones calcined at 400° C. with uptake of ca 25% at saturation. The latter samples almost all reach their top conductivities at saturation or at water content only slightly above 100%RH. As to the solids, calcined at 1000° C., their conductivities at 100%RH are below $10^{-5}$S cm$^{-1}$. They however continue to increase up to $10^{-3}$ S cm$^{-1}$ when extra moisture is added.

Figure 17B:
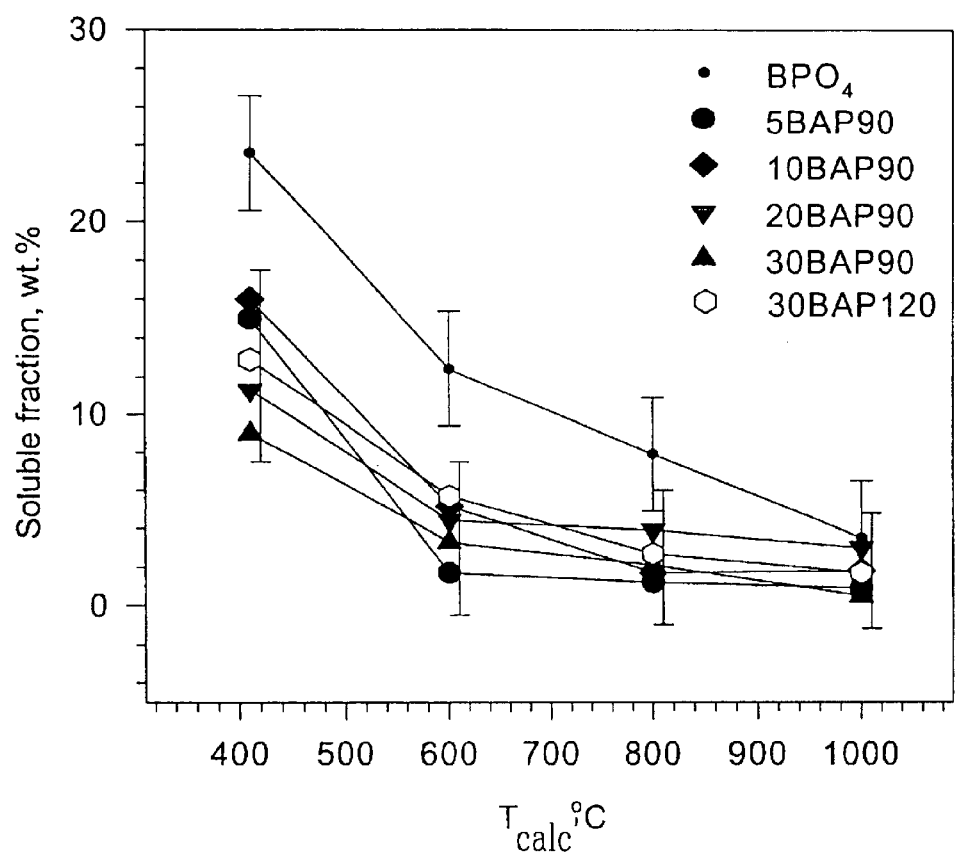
Figure 19:
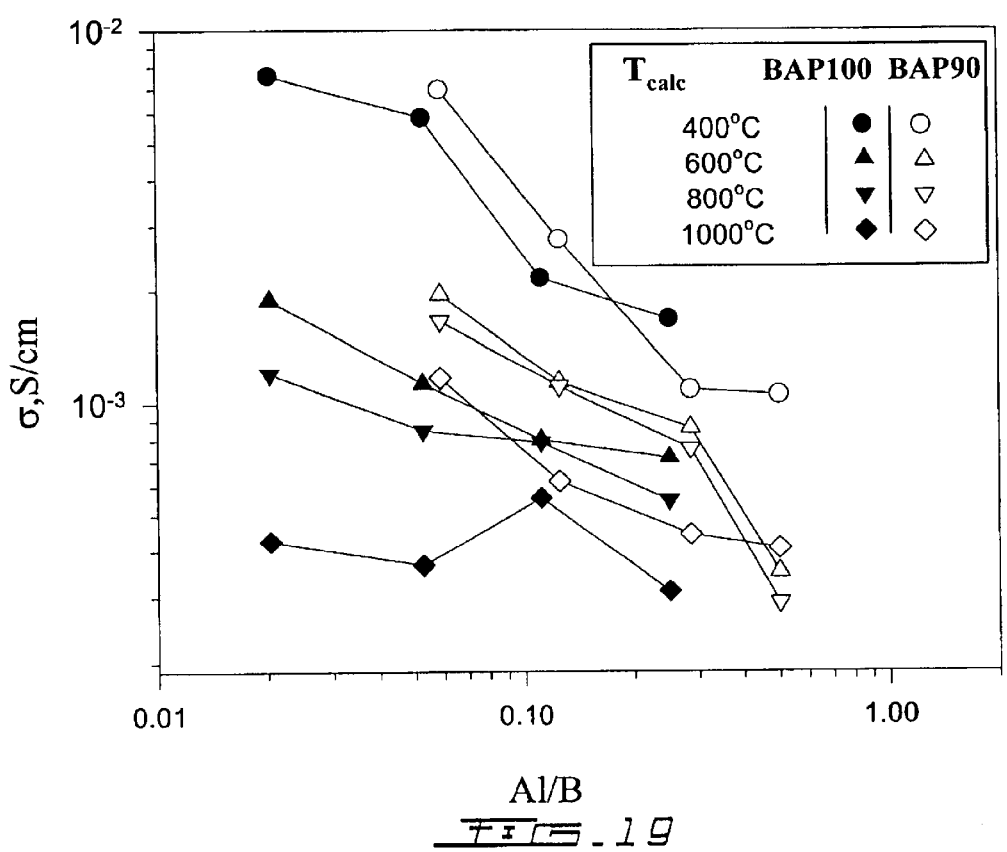
FIG. 19 shows the conductivity at ambient temperature of different samples of aluminum boron phosphate containing ca 40% of water as a function of Al/B ratio.

After calcination at 400° C., the specimens with low Al content (2BAP100, 5BAP90, 5BAP100) have essentially the same conductivity as the reference BPO$_4$ whereas their stability in water was significantly higher (FIG. 17). However the solids containing Al appear to be less stable with respect to calcination than pure BPO$_4$, as their conductivity decreases faster with T$_{calc}$ than that of BPO$_4$. Treatment at 1000° C. brings about a decrease in the conductivity of all Al-BPO$_4$ specimens to values about half an order of magnitude lower than the studying points at 400° C. The less conductive specimens are the ones which have higher Al/B ratios (data not shown). This can be seen more clearly from the dependence of σ on the Al content presented in FIG. 19 in the form of curves, corresponding to different calcination temperatures. It can be seen from the figure that for all series of specimens the conductivity rapidly drops with an increase in Al content.

MAS NMR Spectroscopy

MAS NMR spectroscopy was employed in this work in order to examine the structural changes of the solids during calcination and as a result of their interaction with water. The spectra obtained from the $^{27}$Al, $^{31}$P, $^{11}$B and $^{1}$H nuclei were recorded for dehydrated and rehydrated 20BAP100 and 20BAP90 calcined at 400 and 1000° C. and were related to the spectra of the same nuclei (excepting $^{27}$Al) recorded for the reference BPO$_4$ sample.

$^{11}$B MAS NMR spectra (not illustrated) of all samples studied were invariant under the treatment (calcination or hydration) and exhibited a single resonance with an isotropic chemical shift of δ=−3.7−−3.8 ppm from BF$_3$Et$_2$O. This signal is assigned to tetrahedrally coordinated BO$_4$ with the shift consistent with δ=−3.3 registered for anhydrous commercial BPO$_4$ from AlfaChem [28]. These results evidence that in Al-BPO$_4$ boron coordination is little affected by hydration and does not depend on the thermal treatment and aluminum content in Al-BPO$_4$. A similar result was previously observed for BPO$_4$ [Mikhailenko et al., 1998 (supra)] where $^{11}$B MAS NMR spectra did not change after thermal treatment and hydration. It should be mentioned that the $^{11}$B chemical shift range is narrow [29], so that the partial hydration of BPO$_4$ species may escape notice, provided B remains tetracoordinated.

The $^{27}$Al NMR spectra of both hydrated and dehydrated samples of 20BAP100 and 20BAP90 calcined at 400° C. were very much alike (data not shown).

After hydration $^{27}$Al NMR MAS spectrum of 20BAP90 (data not shown) remained identical to that of the dehydrated parent solid, while in the spectrum of 20BAP100 the intensity of the peak from 6-coordinate aluminum became bigger and a downshift shoulder appeared at δ=8 ppm. This clearly indicates that adsorbed water alters the coordination environment of at least part of the aluminum atoms.

The tendency of Al-BPO$_4$ to hydrolysis as it can be seen from FIG. 17 is critically dependent on calcination temperature and aluminum content. It decreases with calcination obviously due to the increased degree of crystal perfection, namely decreased lattice distortion, longer chains of BO$_4$PO$_4$ tetrahedra and larger crystallite size [Mikhailenko et al., 1998 (supra)]. Aluminum phosphates introduced into BPO$_4$ acts in a similar way, substantially decreasing the solubility of these solids (FIG. 17). The difference in stability between BPO$_4$ and Al-BPO$_4$ in water is most significant at low calcination temperature (400° C.), and then decreases as temperature is raised, becoming negligible when the solids calcined at 1000° C.

It is believed that hiss occurs because at comparatively low calcination temperature the structure of the solids is poorly ordered, and more stable AlO$_4$ tetrahedra, talking the positions, prevent boron phosphate from hydrolysis and subsequent dissolution. Calcination performed at higher temperature brings about The formation of better crystallized bulk aluminum phosphate, which is less dispersed in BPO$_4$ crystals and thus has less impact on its solubility. However the BPO$_4$ phase itself, when calcined at higher temperature becomes sufficiently water resistant, and as a consequence there is no difference between the solubility of BPO$_4$ and Al-BPO$_4$ calcined at 1000° C.

In any event, without being limited by a particular theory, the results presented herein confirm that the partial replacement of boron with aluminum in boron phosphate brings about an increase in inertness of the solid towards water. In some cases it is achieved at the expense of a decrease in its conductivity. However samples with Al/B(5/95 calcined at T<600° C. where found possessing the same conductivity as pure BPO$_4$, in spite of their lesser solubility compared to boron phosphate. This observation reinforces the view that a compromise between high proton conductivity and high stability of boron phosphate is feasible, and can be achieved, among other approaches, through chemical modification of the solid.

EXAMPLE 20
Composite Membrane Comprising the Basic Filler Material PEI.

Polyethermide (PEI) has been chosen as a further component for preparation of polymer blend membranes. PEI is a high temperature engineering thermoplastic, which is miscible with PEEK, producing blends with increased toughness over both components [30]. Blending of sulfonated PEEK (SPEEK) with animated polymers can lead to formation of hydrogen bonds through proton, shared by sulfonic acid and amino groups, and can thus affect the properties of the polymer. In reference [31] it was shown, that blending of SPEEK with PEI involves a reduction of swelling in aqueous media and therefore brings about an improvement in the mechanical properties of SPEEK membranes.

One way to build up the proton conductivity of an organic polymer is to mix it with an inorganic acid. This approach was commonly employed for modification of a wide variety of polymers. However, as it follows from the review by Lassegues [32], it has met with only limited success, as usually the obtained conductivities did not reach high enough values. More recently doping with a liquid acid was shown to improve essentially the electrical properties of PEM [34] in some instances. For SPEEK, which possesses a rather high intrinsic conductivity, such a blending could be beneficial, allowing a further increase in the conductivity of the membranes. The instant example is an attempt to study the impact of blending with a basic filler such as PEI and/or doping with HCl and $H_3PO_4$ on the electrical properties of the SPEEK based polymer membranes.

Experimental

Polyetherimide (PEI) Utem was supplied by General Electric Co. in form of extrudates. Polyether ether ketone (PEEK) from Polyscience Inc. was sulfonated at room temperature using concentrated $H_2SO_4$ (95–98%) according to a procedure previously describe. The duration of the reaction was varied from 24 to 112 h in order to increase the sulfonation degree. $H_2SO_4$, HCl, $H_3PO_4$ and all solvents were of reagent grade or better and were used as received.

Membrane Preparation

The pure SPEEK membrane and blend SPEEK/PEI membranes were prepared by the solution casting. The polymers, taken in appropriate proportions, were dissolved at room temperature in dimethylacetamide (DMAc) to form a 10% solution, which was then stirred for 8 hours. After evaporation of most of the solvent the resulting blend was cast onto a glass plate using a casting knife. The cast membranes were dried at room temperature overnight and then for 46 h at 60° C. and for 12 h more at 80–120° C. The degree of sulfonation (D.S.) was determined both by elemental analysis for sulfur and by titration using the following procedure. 2–5 g of the SPEEK was kept in 1M aqueous NaOH for 1 day and then back titrated with 1M HCl using phenolphthalein as indicator. Doping with HCl and $H_3PO_3$ was performed by soaking the membranes in aqueous 3M acids for 3 weeks. The membranes were then washed and stored in distilled water.

Electron Microscopy

The morphologies of the composite polymer membranes were investigated using a scanning electron microscope (JSM-849, JEOL). Specimens for the SEM were prepared by freezing the dry membrane samples in liquid nitrogen and breaking them to produce a cross-section. Fresh cryogenic fractures of the samples were vacuum spray-coated with a thin layer of Au/Pd prior to viewing in SEM.

Water Absorption of Membranes

The water absorption of SPEEK membranes was determined from the difference in weight (W) between the dry and the swollen membranes. The membrane cast from DMAc solution after drying, was weighed and then soaked in water until the weight remained constant. It was then taken out, wiped with blotting paper and weighed again. The percentage of water absorbed was calculated with reference to the weight of the dry specimen, (Wwet/Wdry−1)×100%.

Conductivity Measurements

The proton conductivity of the membrane samples was measured by the AC impedance spectroscopy over the frequency range of 1 $10^7$ Hz with oscillating voltage 50–500 mV, using a Solarton 1260 gain phase analyzer. A sample of the membrane with diameter 13 mm was placed in an open, temperature controlled test cell, where it was clamped between two blocking stainless steel electrodes with a permanent pressure of about 3 kg/cm2. The disadvantage of an open cell is that the specimen may sustain dehydration during the measurement. However it allows to provide good electrode-specimen contact (by applying sufficient thrust using an external load) and gives an access to a larger temperature range (typically up to 150° C.). Besides, the thin specimen discs (100–500 $\mu$m) are tightly compressed between blocking electrodes, and can lose water only through their edges, which is negligible at low temperature over the experimental time scale.

The conductivity δ of the samples in transverse direction was calculated from the impedance data, using the relation (δ=d/RS where d and S are the thickness and face a area of the sample respectively, and R was derived from the low intersect of the high frequency semicircle on a complex impedance plane with the Re(Z) axis. The impedance data were corrected for the contribution from the empty and short-circuited cell.

Results

Sulfonation off PEEK up to D.S. below 60% yields membranes with poor conductivity, typically of the order of $10^{-4}$ S/cm at room temperate. Therefore, only membranes based on SPEEK with higher D.S. are further studied and discussed. In Table 5, the composition of the specimens are listed along with their thickness and swelling in water at ambient temperature. The conductivity of membranes untreated and doped with HCl and $H_3PO_4$ is also indicated in the table.

TABLE 5

Characterization of the membranes

| PEEK D.S., % | PEI content, wt. % | Thickness of hydrated membrane, $\mu$m | Water uptake, wt. % | Conductivity, S/cm at 25° C. | at 100° C. |
|---|---|---|---|---|---|
| 65 | — | 300 | 33 | $7.9 \times 10^{-4}$ a) | $8.1 \times 10^{-3}$ a) |
|  |  |  |  | $2.8 \times 10^{-3}$ b) | $1.7 \times 10^{-2}$ b) |
|  |  |  |  | $3.2 \times 10^{-3}$ c) | $2.4 \times 10^{-2}$ c) |
| 70 | — | 350 | 40 | $1.4 \times 10^{-3}$ a) | $8.6 \times 10^{-3}$ a) |
|  |  |  |  | $4.1 \times 10^{-3}$ b) | $2.5 - 10^{-2}$ b) |
|  |  |  |  | $5.7 \times 10^{-3}$ c) | $4.1 \times 10^{-2}$ c) |
| 72 | 0 | 300 | 47 | $1.0 \times 10^{-3}$ a) | $1.3 \times 10^{-2}$ a) |
|  |  |  |  | $3.0 \times 10^{-3}$ b) | $5.7 \times 10^{-2}$ b) |
|  |  |  |  | $5.1 \times 10^{-3}$ c) | $7.0 \times 10^{-2}$ c) |
|  | 2 | 450 | 61 | $2.2 \times 10^{-3}$ a) | $1.9 \times 10^{-2}$ a) |
|  | 5 | 600 | 51 | $1.8 \times 10^{-3}$ a) | $2.3 \times 10^{-2}$ a) |
|  |  |  |  | $4.2 \times 10^{-3}$ b) | $6.4 \times 10^{-2}$ b) |

TABLE 5-continued

Characterization of the membranes

| PEEK D.S., % | PEI content, wt. % | Thickness of hydrated membrane, μm | Water uptake, wt. % | Conductivity, S/cm at 25° C. | at 100° C. |
|---|---|---|---|---|---|
| | 15 | 400 | 42 | $7.1 \times 10^{-3}$ c) | $8.3 \times 10^{-2}$ c) |
| | | | | $9.1 \times 10^{-4}$ a) | $1.4 \times 10^{-2}$ a) |
| | | | | $2.9 \times 10^{-3}$ b) | $3.1 \times 10^{-2}$ b) |
| | | | | $4.1 \times 10^{-3}$ c) | $3.0 \times 10^{-2}$ c) |
| | 25 | 250 | 31 | $7.9 \times 10^{-4}$ a) | $4.8 \times 10^{-3}$ a) |
| | | | | $1.0 \times 10^{-3}$ b) | $7.3 \times 10^{-3}$ b) |
| | | | | $3.1 \times 10^{-3}$ c) | $2.1 \times 10^{-2}$ c) | a) non-doped
b) doped with $H_3PO_4$
c) doped with HCl

SPEEK Membranes Doped With HCl and $H_3PO_4$

As can be seen from Table 5, the room temperature conductivity of untreated SPEEK membranes increased when D.S. is raised from 65 to 70%. The sample with D.S.=72% displayed slightly lower conductivity at room temperature, however at 100° C. it exhibited the maximum value as compared to the other two membranes. Treatment with the acids further increased the conductivity up to 2–3 times for 65%SPEEK and 3–5 times in the case of 70% and 72%SPEEK. In all three cases doping with a stronger acid, HCl, resulted in a larger increase of conductivity than when membranes were treated with less strong $H_3PO_4$ it is worth mentioning that the SPEEK specimens doped with the acids were tested after storage in water at room temperature for several month which did not affect their conductivity. This testifies that HCl and $H_3PO_4$ form solutions with SPEEK and the polymer can retain them firmly enough. Thus this method of enhancing the conductivity should be applicable to actual electrochemical devices.

SPEEK/PEI Membranes

The morphology of polymer blends of unsulfonated PEEK with PEI was previously studied in ref. [30]. It was shown that phase separation occurs during PEEK crystallization, which leads to PEI segregation into amorphous phase between the PEEK texture units The sulfonated PEEK studied in the present work was fully amorphous, as confirmed by X-ray diffraction. Nevertheless, phase segregation occur in a similar way in the SPEEK/PEI blend polymers, data not shown. The microphotographs display the formation of small (less than 1 μm) spherical particles of PEI at 5%PEI content and their growth up to ~1 μm at 15% PEI and ~2–3 μm at 25% PEI. The distance between PEI particles in the SPEEK matrix apparently remains unchanged.

Figure 20:
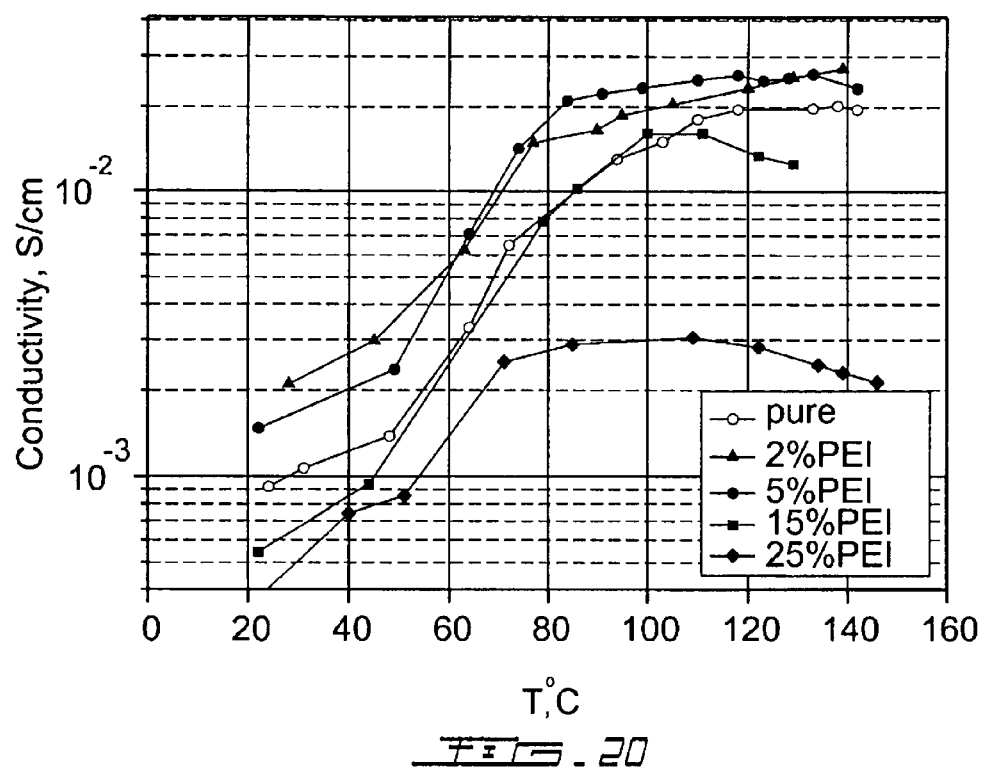
FIG. 20 shows the conductivity of a SPEEK/PEI composite membrane as a function of temperature.

The analysis of the temperature dependence of conductivity for blend membranes is depicted in FIG. 20. It can be seen that the thermally stimulated enhancement of the conductivity slows down above 80–90° C. and for some specimens a little decay is observed above 110–120° C. This behavior suggests that some dehydration of the samples occurs at the higher temperatures, reached in these experiments. As all measurements were carried out with the same heating rate of ~3 grad/min, these data can be used as an indication of the capacity of the membranes to retain water.

Blending SPEEK with PEI affected the conductivity of the blend membranes as can be seen from FIG. 20. However the dependence of conductivity on the PEI content in the blend membranes is not monotonous. This follows from the fact that the curve of δ vs. T for pare SPEEK in FIG. 20 occupies an intermediate position between the curves, corresponding to the other specimens. The dependence of conductivity on PEI content in blend membranes at 25 and 100° C. indicates that the conductivity passes through the maximum at small PEI content (ca 2–5%) and then decreases down to values below that of pure SPEEK. This maximum was not detected in ref. [30][30] because only blends with PEI contents above 10% were studied there.

SPEEK/PEI Membranes Doped With HCl and $H_3PO_4$

Figure 21A:
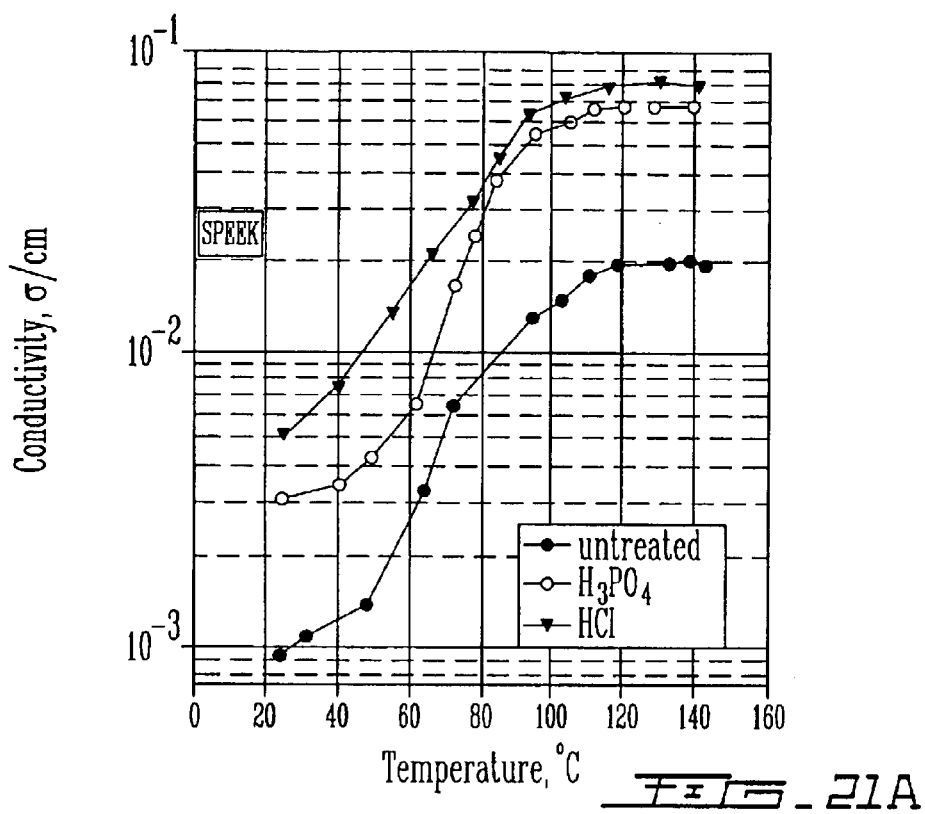
FIG. 21 shows the conductivity of a composite membrane of SPEFK/PEI doped with $H_3PO_4$ and HCl as a function of temperature.
Figure 21B:
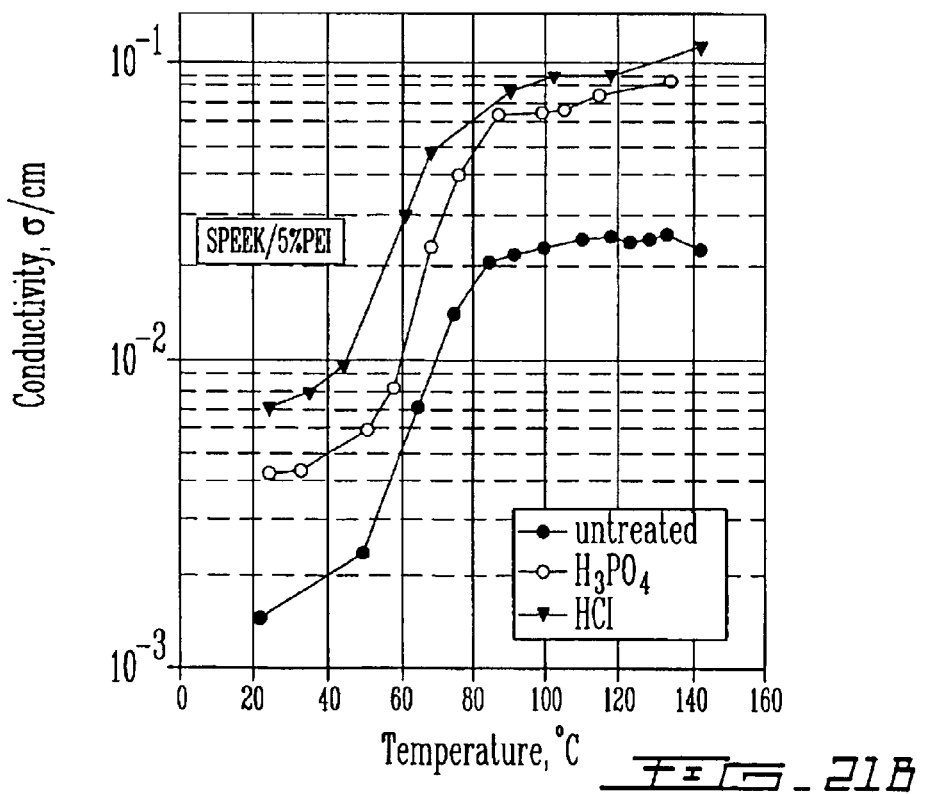
Figures 21C, 21D:
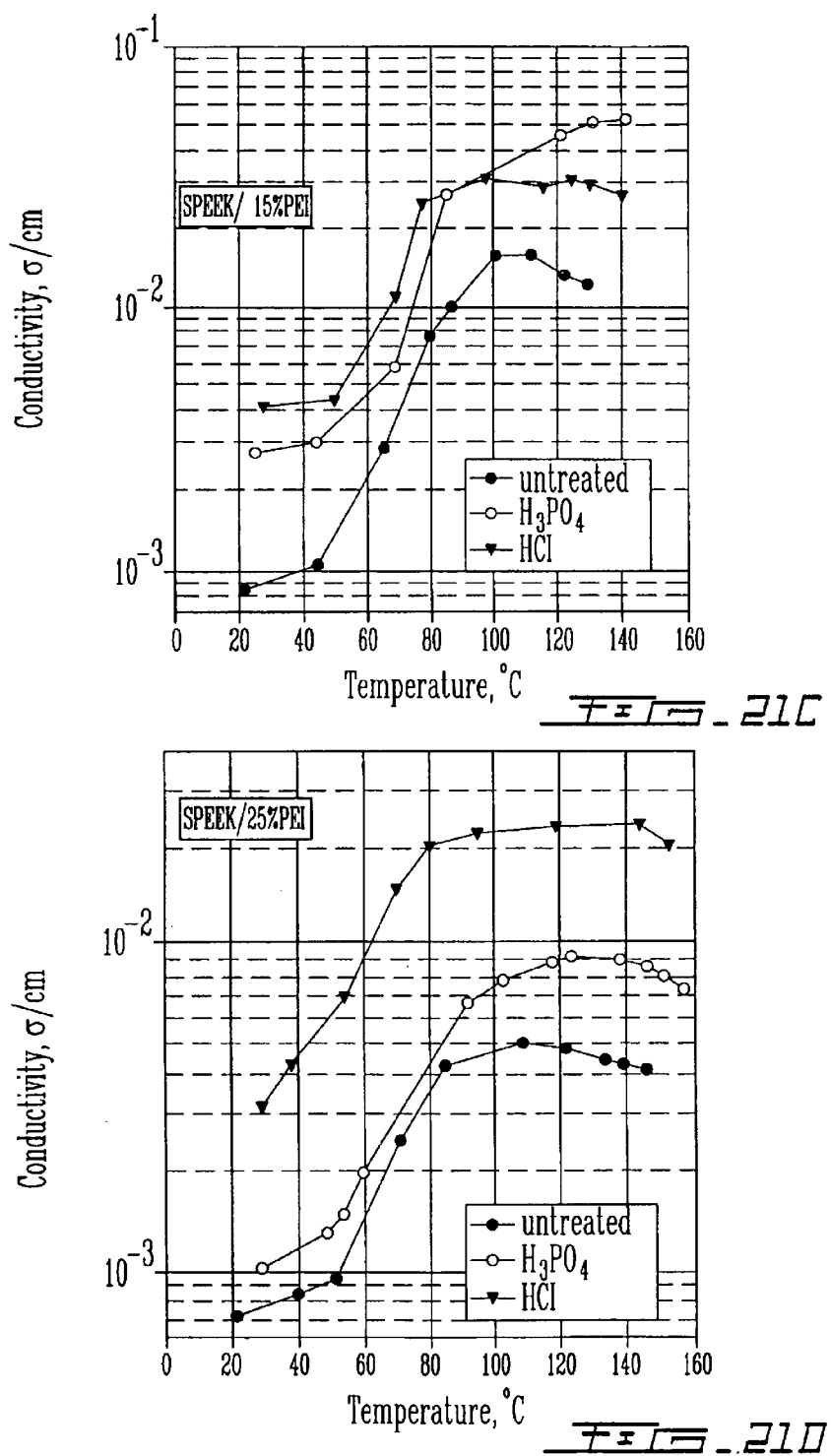

The influence of doping with the acids on the conductivity of the SPEEK/PEI blend membranes can be followed from FIG. 21. As in the case of pure SPEEK specimens, the conductivity of blend membranes significantly increased with doping and again, treatment with HCl generally produced larger enhancement than that with $H_3PO_4$. It is worth noting that the membrane, containing 5%PEI exhibited the maximum conductivity, which was close to $10^{-1}$ S/cm despite dehydration above 80° C.

In distinction to SPEEK, PEI does not contain any protonated species and is commonly regarded as an effective insulator. Blending with an insulator is expected to bring about a decrease in conductivity, which turned out to be not true in the case of SPEEK/PEI blend membranes, where the dependence of conductivity on PEI content follows a curve with a maximum. This effect is however well known in the art for inorganicsolid electrolytes, where a drastic increase in conductivity is often observed upon introduction of a dispersed insulating phase into a pure ionic material.

Blending sulfonated PEEK with PEI results in an increase in membrane water uptake at low PEI content, and a decreased water absorption when the PEI concentration is above 5%. The proton conductivity of blend membranes, both doped and non-doped with HCl and $H_3PO_4$ expressed as a function of PEI content, follows the same trend. Doping with the acids usually enhanced the membrane conductivity by several times, and the effect of doping with HCl was generally more significant than that with $H_3PO_4$. The SEM study has shown that PEI forms spherical particles, dispersed in the SPEEK matrix, while the DSC analysis evidenced, that at the same time PEI partially dissolves in SPEEK, affecting the swelling properties of the latter. This explains the unusual behavior of the blend membrane with reference to water absorption and conductivity. Indeed, the introduction of a small quantity of PEI brings about an increase in the membrane capacity to absorb water due to formation of new adsorption sites along the interface between the two polymer phases. Further increase in PET content results in a reduced membrane swelling due to the increased fraction of PEI dissolved in the SPEEK matrix.

Thus, the introduction of PEI to an acidic polymer such as PEEK in the composite membranes of the present invention could enhance the efficiency and/or stability of these membranes.

EXAMPLE 21
Composite Membrane Comprising POD

Aromatic polyoxadiazole (POD) was tested as a material for PEMFC. The PODs are known to be thermoplastics, possessing good strength, fatigue, resistance and hydrolytic stability [34–36]. It was previously shown, that thin films based on aromatic PODs can be electrochemically doped to obtain an electrically conducting polymer. It was assumed that in the process of doping, the oxadiazoie rings can act as an electron acceptor forming stable anionic radicals. Despite the fact that many procedures of POD synthesis have already been explored and the properties of a number of POD derivatives have been studied [34–36], still little is known about the electrical conductivity of this group of polymers.

The present study represents an attempt to study the electrical conductivity of both doped and undoped PBO membranes as function of the preparation procedure, mechanical treatment and temperature.

Synthesis of POD Membranes

Membrane synthesis was performed according to the reaction route described in [35]. Pure POD was synthesized from hydrazine sulfate and terephtalic acid in concentrated $H_3PO_4$. TBI-POD was prepared by the same procedure using tert-butyl-isophtalic acid instead of terepbtalic acid. Since the mechanical properties of TBI-POD were somewhat better than pure POD, we prepared co-polymers, containing both repeat units. Membranes were prepared from the polymer solution in sulfuric acid by casting onto a glass plate and then immersion into water for phase inversion. The membrane designation is presented in Table 6, where the concentration of polymer solution in the acid before phase inversion is presented along with the pressure values used for membrane mechanical compression.

TABLE 6

Preparation conditions, mechanical pressure applied during post-treatment and thickness of POD based membranes

| Sample designation | POD wt % | TBI-POD, wt % | Polymer concentration in acid wt % | Pressure, ton/cm² | Thickness, μm undoped | Thickness, μm doped |
|---|---|---|---|---|---|---|
| A8 | 25 | 75 | 8 | 0 | 550 | 730 |
|  |  |  |  | 3.6 | 120 | 220 |
|  |  |  |  | 5.7 | 100 | 170 |
| A10 | 25 | 75 | 10 | 0 | 170 | 180 |
|  |  |  |  | 3.4 | 100 | 120 |
|  |  |  |  | 5.7 | 40 | 60 |
| B8 | 0 | 100 | 7.5 | 0 | 300 | 400 |
|  |  |  |  | 3.4 | 130 | — |
|  |  |  |  | 4.5 | — | 125 |
|  |  |  |  | 5.7 | 70 | 85 |

Conclusion

Polyoxadiazole based membranes were synthesized and tested for electrical conductivity in both as-prepared and $H_3PO_4$ doped forms. The undoped materials were found to exhibit a rather low conductivity when conditioned in saturated water vapor, while the membranes impregnated with phosphoric acid retained a high conductivity of the order of $10^{-1}$ S/cm in air and after having up to 150° C. even after 1 month of storage. Taking into consideration that NAFION shows a sharp decrease in proton conductivity above 100° C. due to dehydration, it is apparent that the POD based membranes are of a distinctive interest for PEWC application.

The mechanical properties of the membranes, prepared using the phase inversion technique were found to be rather poor due to the presence of large pores. However, it turned out to be possible to control the porosity using mechanical compression, which eliminated macropores and imparted better flexibility and strength to the polymer.

Thus, polyoxadiazole could be used in the composite membranes described above and could contribute to its stability and efficiency Although the present invention has been described hereinabove by way of preferred embodiments thereof, it can be modified, without departing from the spirit and nature of the subject invention as defined in the appended claims.

REFERENCES

1. H. P. Dhar, On solid polymer fuel cells, J. Electroanal. Chem., 357(1993) 237.

2. A. J. Appleby, Recent developments and application of the polymer fuel cell, Phil. Trans. Royal Soc. London, A 354(1996) 1681.

3. J. P. Shoesmith, R. D. Collins, M. J. Oaeley, D. K. Stevenson, Status of solid polymer fuel cell system development, J. Power Source, 49(1994) 129.

4. K. D Kreuer, Proton conductivity: Materials and Applications, Chem Mater., 8(1996) 610.

5. G. Pourcelly and C Gavach, Perfluorinateci membranes, in Ph. Colomban (Ed.), Poton Conductors: Solids, membranes and gels-materials and devices, Cambridge University Press, New York, 1992, pp 294–310.

6. A. E. Steck and C. Stone, Membrane materials in fuel cells, 2nd Int. Symp. on New Materials for Fuel Cell and Modern Battery Systems, Montreal, Canada, July 1997. p 792.

7. O. Savadogo, Emerging membranes for electrochemical systems: (I) solid polymer electrolyte membranes for fuel cell systems, J. New Mat. Electrochem. Syst., 1 (1998) 66.

8. T. Kotayashi, M. RiKuKawa, K. Sanui, N. Ogata, Proton conducting polymers derived from poly(ether-ether ketone) and poly(4-phenoxybenzoyl-1,4-phenylene), Solid State Ionics, 106 (1998) 219.

9. J. Kerres. A. Ullrich and Th. Haring, New ionomer membranes and their fuel cell application: 1. Preparation and characterization, 3rd Int. Symp. on New Materials for Electrochemical Systems, Montreal, Canada, July 1999, p.230.

10. S. D. Mikhailenko, S. Kaliaguine J. B. Moffat, Electrical Impedance studies of the ammonium salt of 12-tungstophosphoric acid in the presence of liquid water, Solid State Ionics, 99 (1997) 281.

11. O. Nakamura and I. Ogino, electrical conductivities of some hydrates of dodecamolybdophosphoric acid and dodecatungstophosphoric acid and their mixed crystals, Mater. Res. Bull., 17 (1982) 231.

12. S. D. Mikhailenko, S. M. J. Zaidi and S. Kaliaguinec Development of zeolite based proton conductive membranes for use in direct methanol fuel cells. Report submitted to Natural Resources Canada, Ottawa, 1997.

13. X. Jin M. T. Bishop T. S. Ellis and F. E. Karasz, A sulfonated poly(aryietrier-ketone). British Polym. J., 17 (1985) 4.

14. C. Bailly, D. J. Williams. F E. Karasz and W. J. McKnight, The sodium salts of sulfonated poly(aryl ether ether Ketone) (PEEK): preparation and characterization, Polymer, 28(1987) 1009.

15. M. T. Bishop, F. E. Karasz, P. S. Russo and K. H. Langley, Solubility and properties of poly(aryl-ether-ketone) in strong acids, Macromolecules, 18 (1985) 86.

16. R. Nolte, K. Ledjeff, M. Bauer, and R. Mulhaupt, Partially sulfonated poly(arylene ther sulfone)- A versatile proton conducting membrane material for modern energy onversion technologies, J.Membrane Sci, 83(1993) 211–220.

17. M. Drzewinkski and W. J. Macnight, Structure and properties of sulfonated polysulfone Ionomers, J. Appl. Polym. Sci., 30 (1985) 4753.

18. J. F. O'Gara, D. J. Williams, W. J. Macnight and F. E. Karasz, Random homogeneous sodium sulfonate polysulfone Ionomers: preparation, characterization, and blend studies, J Polym. Sci. B: Polym. Phys, 25 (1987) 1519.

19. A. Noshay and L. M Roteson, Sutfonated polysulfone, J. Appl. Polym. Sci, 20 (1976) 1885.

20. N Sivashinsky and G. B. Tanny, Ionic heterogeneities in sulfonated polysulfone films, J. Appl. Polym. Sci, 28(1983) 3235.

21. M. Day, J. D. Cooney and D. M. Wiles, Degradation of poly(aryl-ether-ether-Ketone), PEEK as monitored by pyrolysis-GC/MS, TG/MS, J Anal. & Appl. Pyrolysis, 18 (1990) 163.

22. S. Faure, N. Cornet, G. Gebel, R. Mercier, M. Pinari, and B. Sillon, Sulfonated polyimide as novel proton exchange membranes for H2/O2 fuel cell, 2nd Int. Symp. on New Matenals for Fuel Cell and Modern Battery Systems, Montreal, Canada, July 1997, p.818.

23. M. W. Park, J. C. Yang, H. S. Han, Y. G. Shul, T. H. Lee, and Y. Cho, Heteropolyacid(H3PW12O40) incorporated solid polymer electrolyte for PEMFC, Denki Kagaku, 64,6(1996) 743–748.

24. B. Tazi and O. Savadogo, Preparation and characterization of a new membranes based on Nafion, silicotungstic acid and thiophene, 3rd Int. Symp. on New Materials for Electrochemical Systems, Montreal, Canada, July 1999, p.259.

25. K. D. Kreuer, T. Dippel, and J. Maier, Membrane materials for PEM-Fuel cells: A microstructural approach. Proc. Electrochem. Soc., 95 (1995) 241.

26. Y. Sone, P. Ekdunge and D. Simonsson, Proton conductivity of Nafion 117 as measured by a four-electrode AC Impedance method, J. Electrochem. Soc., 143 (1996) 1254.

27. N. Knudsen, E. K. Andersen, I. G. K. Andersen, P. Norby, E. Skou, Solid State Ionics, 61, 153(1993).

28. G. L. Turner. K. A. Smith, R. J. Kirkpatrick, E. Oldfield, J. Magn. Res., 67, 544(1986)

29. G. Engelhardt, D. Michel, "High resolution solid-state NMR of silicates nd zeolites", J.Wiley & sons, New YorK, 1987, p.332.

30. Hudson, S. D.; Davis, D. D.; Lovinger, A. J. Macromolecules 1992, 25, 1759.

31. Cui, W.; Kerres, J.; Eigenberger, G. Separation and Purification technology 1998, 14, 145.

32. Lassegues. J. C. in Proton Conductors: Solids, membranes and gels-materials and devices, Colomban. Ph., Ed Cambridge University Press New York, 1992, pp 311–328.

33. Zaidi, S. M. J Ohen, S. F. Mikhailenko, S. D.; Kaliaguine, S. Proc.3rd Int. Syrnposium on New Materials for Electrochemical Systems, Montreal, Canada, July 1999, pp 225–227

34. Wainright, J. S.; Wang, i-T.; Weng, D.; Savinelt, R. F., Litt, M. J Electrochem Soc 1995,142,121.

35. E. R. Hensema, J P. Boom, M. H. V. Moulder and C. A. Smoulders, J. Polym. Sci. Polym: Chem., 32, 513(1994)

36. E. R. Hensema, M. E. R Sena. M. H. V. Mowider and C. A. Smoulders, J. Polym. Sci. Polym. Chem., 32, 527 (1994).

37. B. Schulz. L. Brehmer, B. Dietzel and Th. Zetzshe, Reactive & Functional Polymers, 30,353(1996)

What is claimed is:

1. A composite electrolyte membrane comprising a polymer matrix and a filler material which contributes to the enhancement of the protonic conductivity of the membrane wherein said filler material is an inorganic solid acid selected from the group consisting of zirconium oxophosphate, titanium oxophosphate, zirconium sulphate, titanium sulphate, boron phosphate, acid grafted silica materials and mixtures thereof.

2. The composite electrolyte membrane of claim 1 wherein said inorganic solid acid is boron phosphate and wherein boron phosphate has been modified to enhance its inertness towards water.

3. The composite electrolyte membrane of claim 1, wherein said polymer matrix is an acid polymer matrix.

4. The composite electrolyte membrane of claim 3, wherein said acid polymer matrix is selected from the group consisting of polysulfones, polystyrenes, polyether imides, polyphenylenes, poly alpha olefins, polycarbonates, and mixtures thereof.

5. The composite electrolyte membrane of claim 3, wherein said acid polymer matrix is SPEEK and said inorganic solid acid is boron phosphate.

6. The composite electrolyte membrane of claim 5, wherein said boron phosphate has been modified to enhance its inertness towards water.

7. The composite electrolyte membrane of claim 1, wherein said inorganic solid acid is acid grafted silica materials.

8. The composite electrolyte membrane of claim 7, wherein said acid grafted silica materials is an ormosil ceramic.

9. A method of increasing the proton conductivity of a composite electrolyte membrane comprising an acid polymer matrix, said method comprising an embedding of a proton conductivity effective amount of an inorganic solid acid in said matrix, wherein said inorganic solid acid is selected from zirconium oxophosphate, titanium oxophosphate, zirconium sulphate, titanium sulphate, boron phosphate, acid grafted silica materials and mixtures thereof.

10. The method of claim 9, wherein said inorganic solid acid is boron phosphate.

11. The method of claim 10, wherein said boron phosphate has been modified to enhance its inertness towards water.

12. A method of increasing the proton conductivity and/or the stability of proton conductivity at a temperature above about 80° C., in a polymer electrolyte membrane for fuel cell, comprising embedding into said polymer a proton conductivity effective amount of an inorganic solid acid, wherein said inorganic solid acid is selected from the group consisting of zirconium oxophosphate, titanium oxophosphate, zirconium sulphate, titanium sulphate, boron phosphate, acid grafted silica materials and mixtures thereof.

13. The method of claim 12, wherein said inorganic solid acid is boron phosphate.

14. The method of claim 13, wherein said boron phosphate has been modified to enhance its inertness towards water.

15. The method of claim 12, wherein said inorganic solid acid is acid grafted silica materials.

16. The method of claim 15, wherein said acid grafted silica materials is an ormosil ceramic.

* * * * *